(12) United States Patent
Matsuo et al.

(10) Patent No.: US 7,667,367 B2
(45) Date of Patent: Feb. 23, 2010

(54) LAMINATED CORE AND METHOD FOR MANUFACTURING THE SAME

(75) Inventors: Hideki Matsuo, Kitakyushu (JP); Norio Tosu, Kitakyushu (JP); Tatsumi Tomozoe, Kitakyushu (JP); Junichi Irie, Kitakyushu (JP)

(73) Assignee: Mitsui High-Tec, Inc., Fukuoka (JP)

( * ) Notice: Subject to any disclaimer, the term of this patent is extended or adjusted under 35 U.S.C. 154(b) by 0 days.

(21) Appl. No.: 12/282,629

(22) PCT Filed: Oct. 11, 2007

(86) PCT No.: PCT/JP2007/069876

§ 371 (c)(1),
(2), (4) Date: Sep. 11, 2008

(87) PCT Pub. No.: WO2008/044740

PCT Pub. Date: Apr. 17, 2008

(65) Prior Publication Data

US 2009/0026873 A1    Jan. 29, 2009

(30) Foreign Application Priority Data

Oct. 13, 2006  (JP)  ............................. 2006-280416
Oct. 30, 2006  (JP)  ............................. 2006-294389
Oct. 31, 2006  (JP)  ............................. 2006-296426

(51) Int. Cl.
  *H02K 1/00*    (2006.01)
  *H02K 1/06*    (2006.01)
(52) U.S. Cl. ...................................... 310/216; 310/217
(58) Field of Classification Search ................. 310/216, 310/217
See application file for complete search history.

(56) References Cited

U.S. PATENT DOCUMENTS

2005/0269891 A1    12/2005    Shinoki et al.

(Continued)

FOREIGN PATENT DOCUMENTS

JP    64-20050 U    1/1989

(Continued)

OTHER PUBLICATIONS

Machine Translation JP2004222355A (2004).*

(Continued)

*Primary Examiner*—Quyen Leung
*Assistant Examiner*—Jose A Gonzalez Quinones
(74) *Attorney, Agent, or Firm*—Westerman, Hattori, Daniels & Adrian, LLP

(57) ABSTRACT

A laminated core formed by reliably and firmly connecting laminated core segments (10) in an annular form by first and second joining sections (19, 20) thereof, the first and second joining sections (19, 20) formed by alternately laminating sets of core segment sheets (21) and sets of core segment sheets (22), each set consisting of a predetermined number of sheets, the core segment sheets having brimmed concavities (24, 25) and brimmed convexities (23, 26) located at both ends of yoke-segment pieces (27, 36), wherein each laminated core segment (10) has round corners formed at both sides of a magnetic pole shaft section (12) and radially outward sides of a magnetic pole tooth section (13) at lower and upper laminated portions of the laminated core segment (10), thereby preventing damage to wires wound around the magnetic pole shaft section (12).

18 Claims, 14 Drawing Sheets

U.S. PATENT DOCUMENTS

2006/0108891 A1* 5/2006 Fujita .................. 310/217

FOREIGN PATENT DOCUMENTS

| JP | 4-39043 U | 4/1992 |
| JP | 10-164782 A | 6/1998 |
| JP | 2003-18802 A | 1/2003 |
| JP | 2004222355 A * | 8/2004 |
| JP | 2005-110464 A | 4/2005 |
| JP | 2005-318763 A | 11/2005 |
| JP | 2005-341684 A | 12/2005 |
| JP | 2005-348553 A | 12/2005 |
| JP | 2006-42520 A | 2/2006 |
| JP | 2006-158002 A | 6/2006 |
| WO | 2006-028179 A1 | 3/2006 |

OTHER PUBLICATIONS

International Search Report of PCT/JP20071069876, date of mailing Jan. 8, 2008.

Office Action dated Nov. 10, 2009, corresponding to Japanese Application No. 2006-324297.

* cited by examiner

LAMINATED CORE AND METHOD FOR MANUFACTURING THE SAME

TECHNICAL FIELD

The present invention relates to a laminated core (especially a laminated core for a stator) produced by laminating and interlocking a predetermined number of core segment sheets for fabrication of laminated core segments each having a yoke-segment section and a magnetic pole and by connecting the laminated core segments in an annular shape at first and second joining sections located at both sides of each yoke-segment section. The present invention also relates to a method for manufacturing the laminated core. In particular, the present invention relates to a laminated core wherein wires fit magnetic pole shaft sections well, and thus wire insulation coatings or the wires themselves are free from damage, and to a method for manufacturing the same.

BACKGROUND ART

As disclosed in Japanese Unexamined Patent Application Publication No. 2005-341684 (to be referred to as Patent Document 1), forming a laminated core with an annular yoke by laminated core segments each having a yoke-segment section and a magnetic pole has facilitated wire windings around magnetic poles of a laminated core and has enhanced the winding density. Each of core segment sheets to form the laminated core segment has a convexity and a concavity to be fitted therein formed at both sides in the radial direction thereof. The convexity is made by oblique cuts at a side of a yoke-segment piece, one cut starting at a point on a radially inward brim at the side of the yoke-segment piece, the other cut starting at a point on an outward edge. Then, sets of one type of the core segment sheets and sets of the other type of the core segment sheets, each sheet having the convexity and concavity, are laminated alternately thereby to form the laminated core segment with first and second joining sections formed at both sides thereof, and the plurality of laminated core segments are connected in a ring shape at the first and second joining sections.

However, the laminated core disclosed in Patent Document 1 is provided with magnetic pole shaft sections each having a rectangular cross section, which damages the wires. Additionally, it is difficult to bend the wires completely perpendicularly at the corners of the magnetic pole shaft sections; thus, spaces are formed between the wires and portions except the corners, thereby lowering the winding efficiency (space factor). Meanwhile, Japanese Unexamined Patent Application Publication No. 2005-348553 (to be referred to as Patent Document 2) discloses a laminated core provided with magnetic pole shaft sections 200 each having a width gradually decreasing at an upper laminated portion 201 in an upward direction and at a lower laminated portion 202 in a downward direction as shown in FIG. 14. According to this method, the wire can be wound around the magnetic pole shaft section 200 without producing spaces at upper and lower ends thereof. The reference numeral 203 designates a core segment sheet.

According to the art disclosed in Patent Document 2, the upper and lower ends of the magnetic pole shaft section 200 have no sharp edges, thereby facilitating smooth wire winding without producing spaces. However, upper and lower ends at radially outward sides of the magnetic pole tooth section 204 located at the end of the magnetic pole shaft section 200 have substantially right angles and sharp edges. As a result, the wires (not shown) wound densely around the magnetic pole shaft section 200 are in close contact with each other, which breaks the insulation coatings of the wires.

In addition, the magnetic pole tooth section 204 is larger than the magnetic pole shaft section 200 and positioned closer to a winding machine. Thus, when wire is wound around the magnetic pole shaft section 200, the wire comes into contact with the magnetic pole tooth section 204, which damages the wire insulation coating or the wire itself. This is liable to occur when the wire is wound at high speeds, which inhibits the improvement in productivity of the winding operation.

According to Patent Document 2, the radial thickness of the magnetic pole tooth section 204 is extremely reduced toward both ends in the circumferential direction, which increases flux decay at both sides of the magnetic pole tooth section 204 thereby to lower the magnetic efficiency. Furthermore, according to Patent Document 2, because the core segment sheets configuring the laminated core segment are punched from the same direction, downward punching burrs 205 remain at the corners of magnetic pole shaft pieces laminated in the lower portion of the magnetic pole shaft section 200 around which a wire is wound. The downwardly projecting punching burrs 205 damage the wire.

Moreover, according to Patent Document 2, a semicircular convexity and a semicircular concavity are formed at both sides of each core segment sheet except at radially outward and inward edges thereof. The core segment sheets are laminated to form the plurality of laminated core segments with joining sections including linear convexities and linear concavities, and the laminated core segments are connected annularly by the joining sections.

However, the linear convexity and the linear concavity are only fitted with each other, but do not produce a restraining force to be applied in the laminating direction. Accordingly, adjoining laminated core segments move vertically, and in some cases, the connected laminated core segments are bent at the joining sections and liable to break apart.

On the other hand, according to Patent Document 1, each of the core segment sheets has the convexity and concavity formed at the full radial width of the yoke-segment piece, and the sets of the core segment sheets of one type and the sets of the core segment sheets of the other type, each set consisting of a plurality of sheets, are laminated alternately to form the laminated core segment having the first and the second joining sections at both ends thereof. However, since the joining sections have no radially extending planes, it is difficult, when two to three laminated core segments are connected, to visually examine from outside if the first and the second joining sections are engaged surely. Consequently, the convexity is fitted in the concavity at a slight tilt, bringing about an inaccurate joint between adjoining laminated core segments. In particular, if dust or the like enters the concavity, or the convexity is damaged, the defective joint between the concavity and convexity occurs.

The present invention has been made under such circumstances and the objects of the present invention are to provide a laminated core that ensures: (1) efficient wire winding around a magnetic pole shaft section at a high space factor without damaging the insulation coating of the wire or the wire itself, and (2) accurate and easy assembly of laminated core segments, and to provide a method of manufacturing the laminated core.

DISCLOSURE OF INVENTION

To accomplish the object, a first invention provides a laminated core having a plurality of laminated core segments connected by first joining sections and second joining sections located at both ends in a circumferential direction of yoke-segment sections of the respective laminated core segments, each of the laminated core segments having: the yoke-segment section, a magnetic pole shaft section projecting radially inward from the yoke-segment section and a magnetic pole tooth section located radially inward from the magnetic pole shaft section, the yoke-segment sections forming an annular shaped yoke, a plurality of magnetic poles being located at predetermined intervals radially inward from the yoke, the magnetic pole composed of: the magnetic pole shaft section and the magnetic pole tooth section, each of the laminated core segments formed by laminating and interlocking a predetermined number of core segment sheets, each of the core segment sheets having: a yoke-segment piece corresponding to the yoke-segment section, a magnetic pole shaft piece corresponding to the magnetic pole shaft section and a magnetic pole tooth piece corresponding to the magnetic pole tooth section, the laminated core comprising: a brimmed concavity and a brimmed convexity respectively located at both ends of each yoke-segment piece, the brimmed concavity having: a triangularly shaped recess notched in a circumferential direction of the yoke-segment piece, a radially outward brim and a radially inward brim, the brimmed convexity having: a triangularly shaped projection projecting in the circumferential direction of the yoke-segment piece and conforming in shape to the recess, a radially outward brim and a radially inward brim, wherein the first and the second joining sections at both ends of each laminated core segment are formed by alternately laminating sets of the core segment sheets of one type and sets of the core segment sheets of the other type, each set consisting of a predetermined number of sheets, each sheet having the brimmed concavity and the brimmed convexity.

In the present invention, the core segment sheet has the same shape as the laminated core segment when viewed from the top thereof; thus, the components of the core segment sheet are accompanied with the term "piece" to distinguish between the components of the core segment sheet and the ones of the laminated core segment.

With the above configuration, the first and the second joining sections each have, in the middle portion at the side in the radial direction thereof, the concavities formed by the triangularly shaped recesses and the convexities formed by the triangularly shaped projections. Accordingly, when the convexities are inserted in the concavities for connection of the laminated core segments, visual inspection for the engagement between the sides allows a decision to be made whether adjoining laminated core segments are connected properly.

The first and the second joining sections at both sides of the laminated core segment are formed by alternately laminating the sets of the core segment sheets of the one type and the sets of the core segment sheets of the other type, each set consisting of a predetermined number (namely, a plurality) of sheets, each of the core segment sheets of either type having the brimmed concavity and brimmed convexity. Thus, the concavities and convexities of the first and the second joining sections are teeth-shaped when viewed from the radial side thereof, thereby completely preventing vertical movement of the adjoining laminated core segments with the first and the second joining sections thereof engaged with each other.

Each of the concavity and convexity to be fitted with each other includes brims at both sides in the radial direction thereof, so that the sizes of the triangularly shaped concavity and convexity, i.e., engagement portions, are small. Furthermore, because the triangularly shaped concavity and convexity are engaged with each other, the radial movement of adjoining laminated core segments is prevented when the brims thereof are fitted with each other. Therefore, the bases of the triangles forming the concavity and convexity preferably have a length in the range of 0.3 to 0.6 times the radial width of each of the sides of the yoke-segment section.

According to the laminated core of the first invention, it is preferable that the triangles forming the brimmed concavity and the brimmed convexity are isosceles triangles and have apex angles in the range of 75 to 105 degrees. In this case, the brimmed concavity and the brimmed convexity have a proper height with respect to the bases and form the first and the second joining sections having a sufficient strength in the radial and circumferential directions.

It is more preferable that the triangles forming the brimmed concavity and brimmed convexity have round apexes. Due to the shape, the strength of the tip of the brimmed convexity is improved to thereby minimize the deformation of the laminated core segment caused by collisions with objects. Furthermore, if the tip of the brimmed convexity comes into contact with a person, accidents such as injury hardly occur.

According to the laminated core of the first invention, it is preferable that the yoke-segment piece of each core segment sheet circumferentially diverges from one end of the magnetic pole shaft piece and has radially inward sides in a straight shape;

the magnetic pole tooth piece of each core segment sheet circumferentially diverges from the other end of the magnetic pole shaft piece and has a radially inward side in an arc-shape and radially outward sides in a straight shape; and distances between inner ends of the yoke-segment piece and outer ends of the magnetic pole tooth piece gradually increase in circumferentially outward directions with increase in distance from the magnetic pole shaft piece. In the laminated core of the first invention, it is more preferable that the radially inward sides of the yoke-segment piece circumferentially diverging from the end of the magnetic pole shaft piece are on a line orthogonal to the centerline of the magnetic pole shaft piece. With the above configuration of the core segment sheet, it is possible to vary the circumferential width of the magnetic pole shaft section and the radial width of the magnetic pole tooth section according to their positions in the laminating direction by carrying out press working while stepwise moving punching die devices (namely, punches and dies, but also simply referred to as "die devices" hereunder) used for forming the magnetic pole shaft pieces, magnetic pole tooth pieces and yoke-segment pieces. In addition, distances between inner ends of the yoke-segment piece and outer ends of the magnetic pole tooth piece gradually increase in circumferentially outward directions with increase in distance from the magnetic pole shaft piece. Accordingly, it is easy to wind the wires around the magnetic pole shaft section of each of the laminated core segments.

According to the laminated core of the first invention, it is preferable that the magnetic pole tooth pieces each circumferentially diverging from the end of the magnetic pole shaft piece have radial widths decreasing in a downward direction at a lower laminated portion of the laminated core segment and decreasing in an upward direction at an upper laminated portion of the laminated core segment so that the magnetic pole tooth section of the laminated core segment has round corners in cross section at the lower and upper laminated portions thereof.

Thus, the round corners can be made at the upper laminated portion and lower laminated portion while the effective radial width of the magnetic pole tooth section is secured, and scratches on the wires are prevented.

According to the laminated core of the first invention, it is preferable that the magnetic pole shaft section of the laminated core segment has a circumferential width gradually decreasing in the downward direction at the lower laminated portion of the laminated core segment and gradually decreasing in the upward direction at the upper laminated portion thereof so that the magnetic pole shaft section has round corners in cross section at the lower and upper laminated portions thereof. This has an advantage that the wires are not damaged.

The laminated core of the first invention may be constituted such that, among the magnetic pole shaft pieces positioned at a middle laminated portion of the magnetic pole shaft section serving as the entirety of the magnetic pole shaft section except the upper and lower laminated portions, the magnetic pole shaft piece at the center in the laminating direction of the middle laminated portion has a maximized width, the width gradually reducing in downward and upward laminating directions thereof. In this case, it is preferable that the widths of the magnetic pole shaft pieces at the middle laminated portion increase or decrease by 0.5 to 8% based on the average width thereof. This allows the cross section of the magnetic pole shaft section to be increased in the center and the wires to be wound rounder, thereby preventing damage to the wires.

According to the laminated core of the first invention, it is preferable that the magnetic pole shaft pieces of the core segment sheets at the upper laminated portion of the laminated core segment have downward punching burrs formed by punching using a pressing machine, and the magnetic pole shaft pieces of the core segment sheets at the lower laminated portion of the laminated core segment have upward punching burrs formed by punching using a pressing machine. This prevents damage to the wire caused by the punching burrs produced by pressing.

According to the laminated core of the first invention, the magnetic pole tooth section may have a centerline at an angle to the centerline of the magnetic pole shaft section, and thus have a skew. In this case, it is preferable that the skew angle $\theta$ at the magnetic pole tooth section satisfies the expression $\tan \theta \leq (B-A)/4H$, wherein the maximum width of the magnetic pole shaft section is A, the maximum width of the magnetic pole tooth section is B and the lamination height of the laminated core segment is H. Such configuration secures spaces for wire winding. It is also preferable that the skew angle $\theta$ satisfies the expression: $C/H < \tan \theta \leq 1.5\, C/H$, wherein the clearance between the adjoining magnetic pole tooth sections is C. In such a case, smoother rotation of a finished motor (rotor) is achieved.

According to the laminated core of the first invention, it is preferable that an engagement groove is formed vertically in the middle of and in a radially outward area of the yoke-segment section of the laminated core segment, and the groove has a width gradually increasing in the radially inward direction thereof. The engagement groove allows the laminated core segment to be fixed to a jig or a winding machine.

A second invention provides a method for manufacturing a laminated core having "n" laminated core segments connected by first joining sections and second joining sections, the first joining section and the second joining section formed by sets of brimmed concavities and sets of brimmed convexities alternately laminated, each of the laminated core segments formed by laminating and interlocking a predetermined number of core segment sheets, each of the laminated core segments having: a yoke-segment section, a magnetic pole shaft section and a magnetic pole tooth section, the magnetic pole shaft section projecting radially inward from the yoke-segment section and having a circumferential width gradually decreasing in the downward direction at a lower laminated portion of the laminated core segment and gradually decreasing in the upward direction at an upper laminated portion thereof, the magnetic pole tooth section located radially inward from the magnetic pole shaft section, the yoke-segment sections forming an annular shaped yoke, a plurality of magnetic poles being located at predetermined intervals radially inward from the yoke, the magnetic pole composed of: the magnetic pole shaft section and the magnetic pole tooth section, each of the core segment sheets having: a yoke-segment piece corresponding to the yoke-segment section, a magnetic pole shaft piece corresponding to the magnetic pole shaft section and a magnetic pole tooth piece corresponding to the magnetic pole tooth section, the yoke-segment piece having the brimmed concavity and the brimmed convexity respectively located at both circumferential ends thereof, the brimmed concavity having: a recess notched in a circumferential direction of the yoke-segment piece, a radially outward brim and a radially inward brim, the brimmed convexity having: a projection, a radially outward brim and a radially inward brim;

the method comprising:

a first step of forming positioning pilot holes at predetermined intervals in a strip material, the strip material made of a magnetic sheet;

a second step of punching first slots and second slots in the strip material having the pilot holes, each of the first slots forming: one side of the magnetic pole shaft piece of the core segment sheet, one radially inward side of the yoke-segment piece, and one radially outward side of the magnetic pole tooth piece, the one radially inward side and the one radially outward side being located on the same side of the strip material as the one side of the magnetic pole shaft piece, each of the second slots forming: the other side of the magnetic pole shaft piece of the core segment sheet, the other radially inward side of the yoke-segment piece, and the other radially outward side of the magnetic pole tooth piece, the other radially inward side and the other radially outward side being located on the same side of the strip material as the other side of the magnetic pole shaft piece;

a third step of forming third slots and fourth slots, the third slot and the fourth slot respectively forming the brimmed concavity and the brimmed convexity located at both circumferential ends of the core segment sheet, the third slot and the fourth slot being interchanged in the positions relative to each other by each predetermined number of sheets;

a fourth step of forming caulking portions at predetermined positions of the core segment sheet for connecting the core segment sheets located above and below the core segment sheet; and a fifth step of punching outlines of the core segment sheets, laminating and interlocking the core segment sheets in a lower die, thereby forming the laminated core segment, wherein in the second step, punching die devices for forming the first and the second slots for the core segment sheets to be positioned at the lower laminated portion of the laminated core segment punch the first and the second slots while moving, stepwise by every core segment sheet, away from a reference line forming a centerline of the magnetic pole shaft piece; and punching die devices for forming the first and the second slots for the core segment sheets to be positioned at the upper laminated portion of the laminated core segment punch the first and the second slots while moving, stepwise by every core segment sheet, closer to the reference line.

According to the method for manufacturing a laminated core of the second invention, in the second step, punching die devices for forming the first and the second slots for the core segment sheets to be positioned at the lower laminated portion of the laminated core segment punch the first and the second slots while moving away from a reference line forming a centerline of the magnetic pole shaft piece stepwise every time the first slot and the second slot are punched out; and punching die devices for forming the first and the second slots for the core segment sheets to be positioned at the upper laminated portion of the laminated core segment punch the first and the second slots while moving closer to the reference line stepwise every time the first slot and the second slot are punched out. Thus, the magnetic pole shaft section of the finished laminated core has no right-angled corners but has round corners in cross section. In other words, the corners of the magnetic pole shaft section have arc-shaped cross sections. According to the method, the core segment sheets which are to be positioned at the lower and the upper laminated portions of the laminated core segment and thus which are different in shape from the ones to be positioned at the other part (middle laminated portion) can be formed sequentially from one strip material sheet with the positions of the slots changed.

Furthermore, in the second step according to the method of the second invention, the first slot and the second slot may be punched simultaneously or sequentially.

According to the method for manufacturing a laminated core of the second invention, the radially inward sides of the yoke-segment piece of the core segment sheet and the radially outward sides of the magnetic pole tooth piece are straight, and distances between the radially inward sides of the yoke-segment piece and the radially outward sides of the magnetic pole tooth piece increase in outward directions with increase in distance from the magnetic pole shaft piece; and in accordance with the movements of the punching die devices for punching the first and the second slots, the radial widths of the magnetic pole tooth pieces to be positioned at the lower laminated portion of the magnetic pole tooth section decrease in a downward direction, and the radial widths of the magnetic pole tooth pieces to be positioned at the upper laminated portion of the magnetic pole tooth section decrease in an upward direction.

Thus, the round corners are formed at both sides in the circumferential direction of the magnetic pole shaft section at the upper and lower laminated portions. At the same time, the round corners are formed at the radially outward sides of the magnetic pole tooth section, i.e., the wire-contacting sides thereof, at the upper and lower laminated portions.

According to the method for manufacturing a laminated core of the second invention, the die devices for punching the first and the second slots may be moved with respect to the magnetic pole shaft section even at the middle laminated portion of the laminated core segment, i.e., in the laminated core segment except the lower and upper laminated portions, so as to maximize the width of the magnetic pole shaft piece laminated at the center in the lamination thickness direction, and gradually decrease the width of the laminated magnetic pole shaft pieces in the downward and upward laminating directions. The laminated core segment is formed which has the magnetic pole shaft section having a cross section swollen in the center.

According to the method for manufacturing a laminated core of the second invention, it is preferable that each of the punching die devices for forming the first and the second slots for the core segment sheets to be positioned at the lower laminated portion of the laminated core segment includes a punch and a die to be provided below and above the strip material, respectively; and each of the punching die devices for forming the first and the second slots for the core segment sheets to be positioned at the upper laminated portion of the laminated core segment includes a punch and a die to be provided above and below the strip material, respectively. Due to this structure, the punching burrs produced at the magnetic pole shaft section, the radially inward sides of the yoke-segment section, and the radially outward sides of the magnetic pole tooth section, all of which are to be in contact with the wires, are directed to the center in the laminating direction (i.e., vertical direction) of the laminated core segment. Thus, the wires are free from damage caused by the projecting punching burrs.

BEST MODE FOR CARRYING OUT THE INVENTION

Figure 1A:
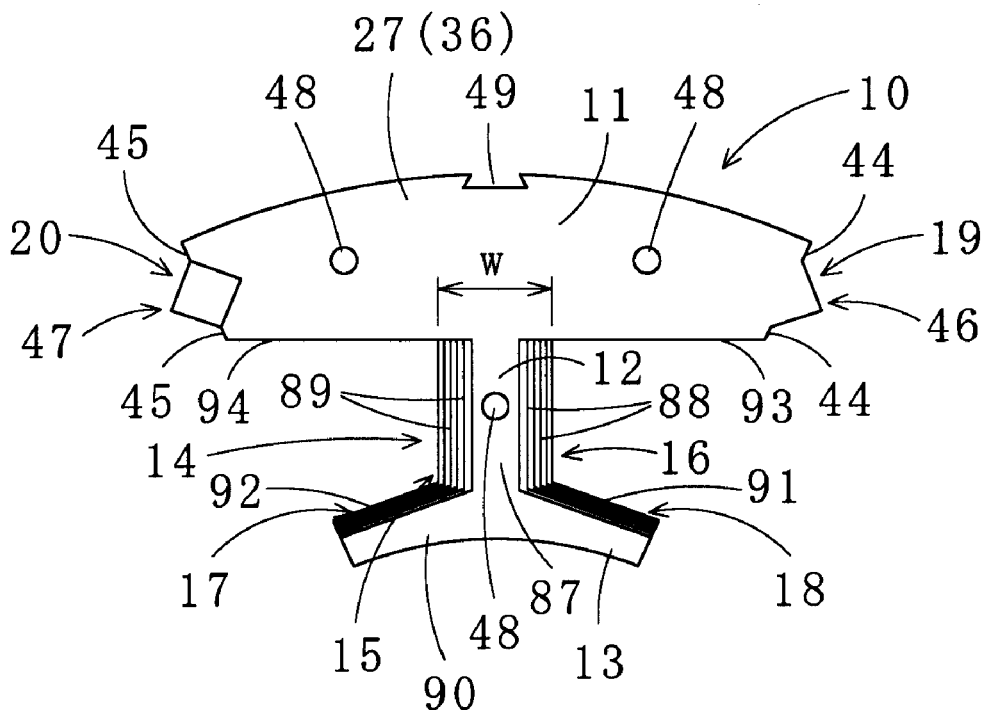
FIGS. 1(A), 1(B) are respectively a plan view and a cross sectional view of a laminated core segment to be used for a laminated core in accordance with a first embodiment of the present invention.

Referring now to the accompanying drawings, laminated cores and methods of manufacturing the same in accordance with embodiments of the present invention are described.

A laminated core (a laminated core for a rotor in particular) in accordance with a first embodiment of the present invention is described. The laminated core is annular-shaped, and has a yoke and magnetic poles 14 located radially inward of the yoke at predetermined intervals. The laminated core is formed by assembling a plurality of laminated core segments 10 shown in FIG. 1(A). Each of the laminated core segments 10 includes a yoke-segment section 11 and the magnetic pole 14 integral with the middle of the radially inward side of the yoke-segment section 11. The yoke-segment section 11 has an arc-shaped radially outward side. The magnetic pole 14 has a magnetic pole shaft section 12 and a magnetic pole tooth section 13 connected thereto. The magnetic pole tooth section 13 has an arc-shaped radially inward end when viewed from the top thereof.

The magnetic pole tooth section 13 circumferentially diverges (extends in opposite directions) from one end of the magnetic pole shaft section 12 so as to be symmetrical about the magnetic pole shaft section 12. As shown in FIG. 1(B), the width of the magnetic pole shaft section 12 decreases gradually in the upward laminating direction at an upper laminated portion and in the downward laminating direction at a lower laminated portion. The magnetic pole shaft section 12 has corners 15, 16 on the left and right of upper and lower ends thereof. The corners 15, 16 are round and not square. The magnetic pole tooth section 13 that is symmetrical about the magnetic pole shaft section 12 has corners 17, 18 on the left and right of upper and lower ends of radially outward sides of the magnetic pole tooth section 13. The corners 17 and 18 are round in cross section. Due to the round corners 15 to 18 formed on both sides of the magnetic pole shaft section 12 at the lower and upper laminated portions and on the radially outward sides of the magnetic pole tooth section 13 at the lower and upper laminated portions, scratches on wires are prevented, bends of the wires are reduced, and the space factor of the wires is improved.

Figure 1B:
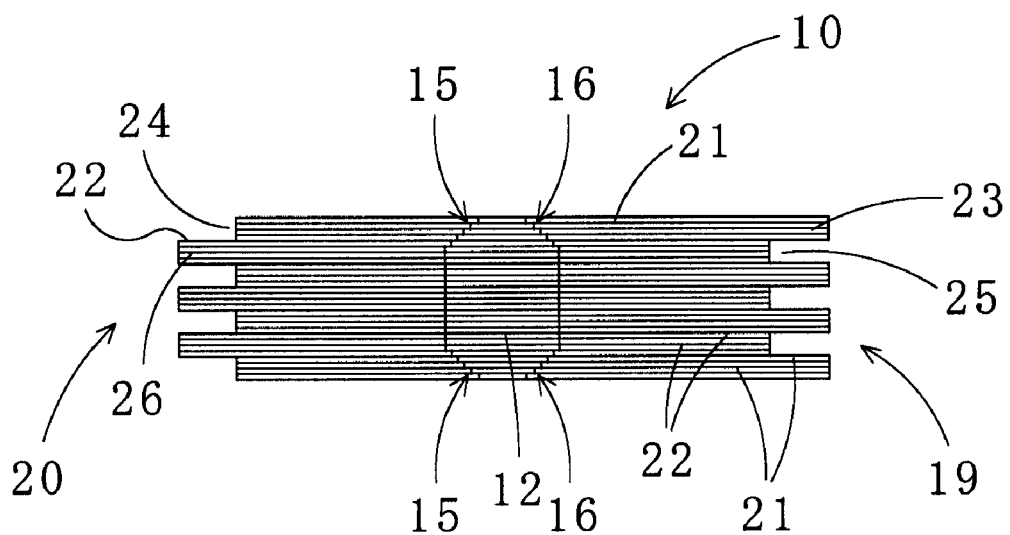
Figure 2A:
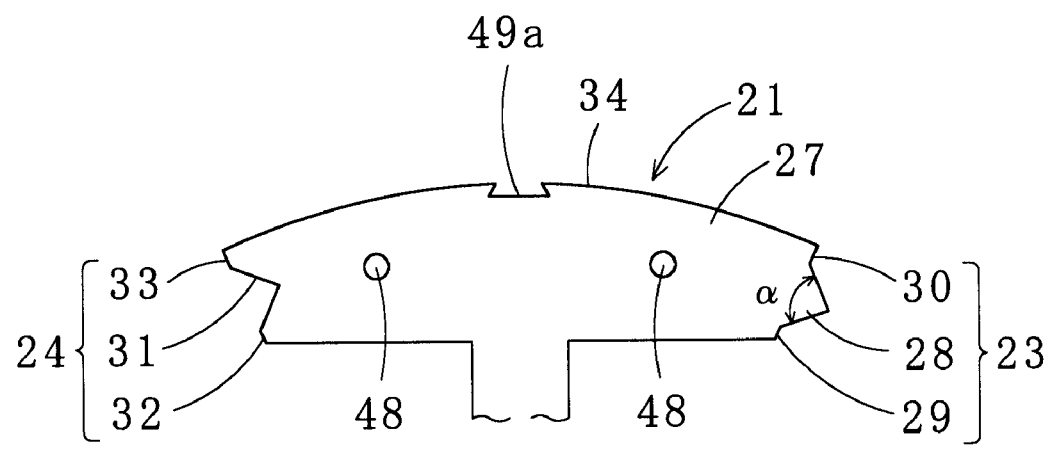
FIGS. 2(A), 2(B) are partial plan views of core segment sheets of the laminated core segment.
Figure 2B:
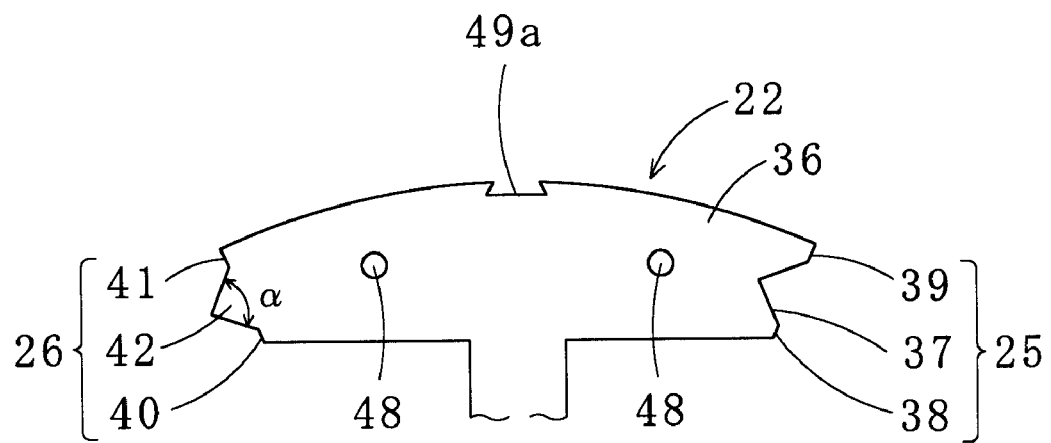

As shown in FIGS. 1(A), 1(B), the yoke-segment section 11 has, at both ends in the circumferential direction thereof, first and second joining sections 19, 20 by which the yoke-segment section 11 is connected with adjacent yoke-segment pieces (not shown). As shown in FIG. 1(B), the first and the second joining sections 19, 20 are formed by alternately laminating in sequence sets of core segment sheets 21 and sets of core segment sheets 22, each set consisting of a plurality of (four in this embodiment) sheets. As shown in FIGS. 2(A), 2(B), the core segment sheets 21, 22, which form the laminated core segment 10, are of two types, i.e., different in the shapes of both ends. The core segment sheet 21 includes a brimmed convexity 23 at one side (right side in FIG. 1) in the circumferential direction thereof and a brimmed concavity 24 having the same size as the brimmed convexity 23 at the other side thereof. In addition, the core segment sheet 22 includes a brimmed concavity 25 at one side thereof and a brimmed convexity 26 having the same size as the brimmed concavity 25 at the other side thereof.

As shown in FIG. 2(A), a yoke-segment piece 27 having an arc-shaped outer side and serving a portion of the core segment sheet 21 has the brimmed convexity 23 located at the one end thereof. The brimmed convexity 23 has a convexity 28 located in the center in the radial direction of the yoke-segment piece 27 and having an isosceles triangular projection. The brimmed convexity 23 also includes brims 29, 30 located at radially inward and outward sides of the convexity 28. An apex angle α of the isosceles triangular convexity 28 is in the range of 75 to 105 degrees. If the apex angle α is less than 75 degrees, the width of the convexity 28 is so narrow that the strength thereof is decreased. If the apex angle α is more than 105 degrees, the height of the convexity 28 is so low that the engagement width for alignment is decreased. The reference numeral 34 designates an arc-shaped contour defining the outer side of the yoke-segment piece 27.

Furthermore, the yoke-segment piece 27 serving as a portion of the core segment sheet 21 has the brimmed concavity 24 formed at the other end thereof. The brimmed concavity 24 has a concavity 31 comprising a recess in the center in the radial direction of the yoke-segment piece 27. The brimmed concavity 24 also includes brims 32, 33 located at both sides in the radial direction of the concavity 31. The concavity 31 and convexity 28 are identical in shape. The brims 29, 30 and brims 32, 33 are located in pairs respectively on radial lines forming the circumferential ends of the yoke-segment piece 27. The bases of the concavity 31 and convexity 28 have a width of 0.3 to 0.6 times the radial width of the ends of the yoke-segment piece 27, and the bases are located in the middle portions in the radial direction of the yoke-segment piece 27. Here, the bases designate a line segment of the convexity 28 that is on a line passing the brims 29, 30, and a line segment of the concavity 31 that is on a line passing the brims 32, 33. If the bases of the concavity 31 and convexity 28 are less than 0.3 times the radial width of the end of the yoke-segment piece 27, strength of the convexity 28 is insufficient. If the bases are more than 0.6 times, the brims 29, 30, 32, 33 are too narrow to ensure contact between the adjacent laminated core segments 10.

Meanwhile, as shown in FIG. 2(B), a yoke-segment piece 36 having an arc-shaped outer side and serving as a portion of the core segment sheet 22 has the brimmed concavity 25 located at one end thereof. The brimmed concavity 25 has a concavity 37 comprising a recess located in the center in the radial direction of the yoke-segment piece 36. The brimmed concavity 25 also includes brims 38, 39 located at radially inward and outward sides of the concavity 37. The brimmed concavity 25 is identical in shape to the brimmed concavity 24 formed at the other end of the yoke-segment piece 27, and is disposed in symmetrical relation to the brimmed concavity 24. The brimmed convexity 26 located at the other end of the yoke-segment piece 36 includes brims 40, 41 located at both sides in the radial direction thereof and a convexity 42 comprising a projection formed in the middle of the end. The brimmed convexity 26 is identical in shape to the brimmed convexity 23 formed at the one end of the yoke-segment piece 27, and is disposed in symmetrical relation to the brimmed convexity 23.

The alternate laminations of the sets of the predetermined numbers of the core segment sheets 21 and the sets of the predetermined numbers of the core segment sheets 22 yield the laminated core segment 10 having the first and the second joining sections 19, 20 located at both ends of the yoke-segment section 11 of the laminated core segment 10. The first and the second joining sections 19, 20 are formed by contacting planes 44, 45 and concave and convex engaging sections 46, 47 as shown in FIG. 1(A). Engagement between the first and the second joining sections 19, 20 allows the adjoining laminated core segments 10 to be fixed firmly in the vertical direction and positioned accurately in the circumferential direction.

The core segment sheets 21, 22 are laminated in the vertical direction and connected by caulking portions 48 (half-blanking caulking or V-caulking) including a caulking projection and a caulking concavity each of a known structure. The laminated core segment 10 employs a half-blanking caulking having a round shape when viewed from the top thereof. However, the lowermost core segment sheet 21 is provided with the caulking portions 48 formed by round holes. In these round holes, the projections of the half-blanking caulkings located immediately above the lowermost sheet 21 are fitted. As shown in FIG. 1(A), the radially outward side of the yoke-segment section 11 is arc-shaped when viewed from the top thereof, and an engagement groove 49 is located in the middle thereof so as to fix the yoke-segment section 11 to an assembling jig. The inlet of the engagement groove 49 is narrower than the inside thereof. In other words, the groove 49 has a trapezoidal cross section gradually widening in the radially inward direction.

Radially inward sides of the yoke-segment section 11 are straight when viewed from the top thereof, and the magnetic pole shaft section 12 is perpendicularly connected to the yoke-segment section 11. The radially outward sides of the magnetic pole tooth section 13 have linear shapes when viewed from the top thereof and intersect with both sides of the magnetic pole shaft section 12 at an obtuse angle (100 to 120 degrees, for example). Thus, spaces for winding wires are broadened toward both circumferential sides with respect to the magnetic pole shaft section 12, thereby making winding of the wires easy.

Figure 3:
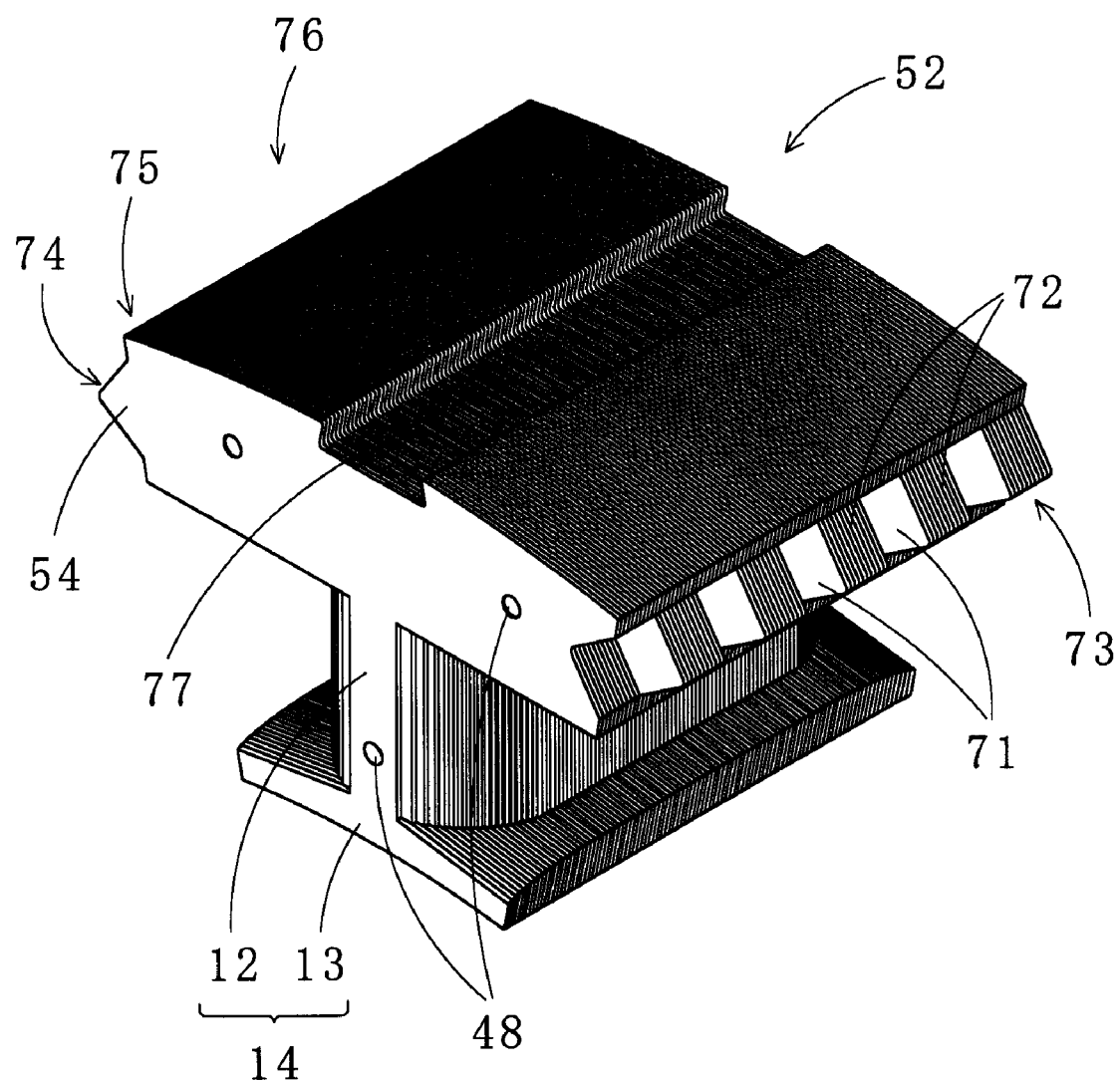
FIG. 3 is a perspective view of a laminated core segment to be used for a laminated core in accordance with a second embodiment of the present invention.
Figure 4A:
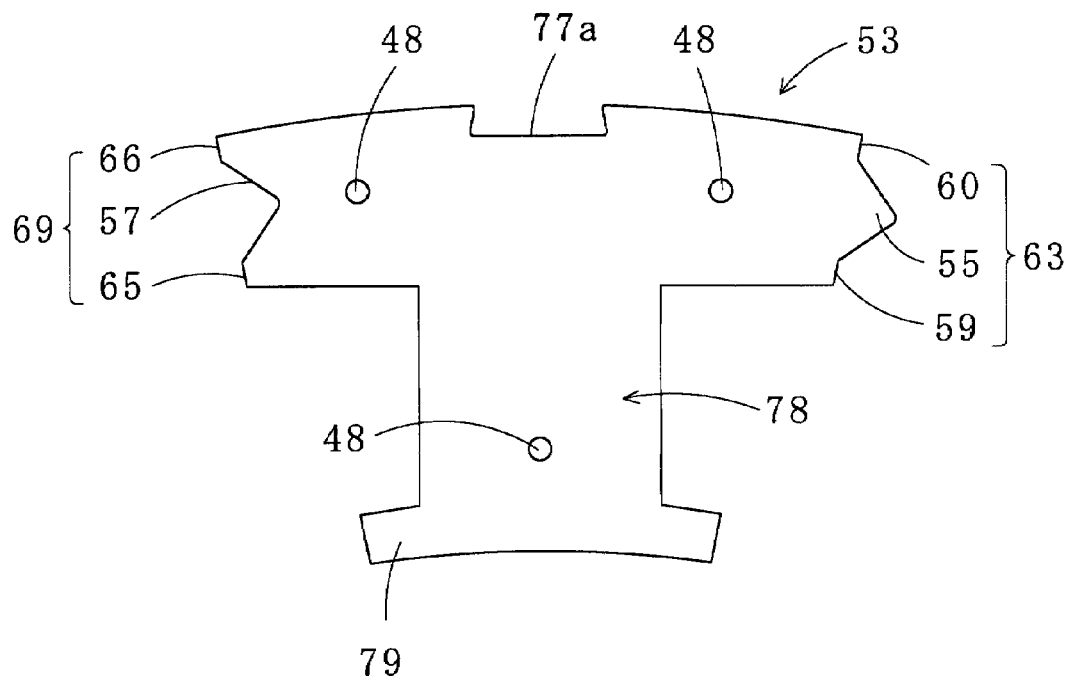
FIGS. 4(A), 4(B) are plan views of core segment sheets of the laminated core segment in accordance with the second embodiment.
Figure 4B:
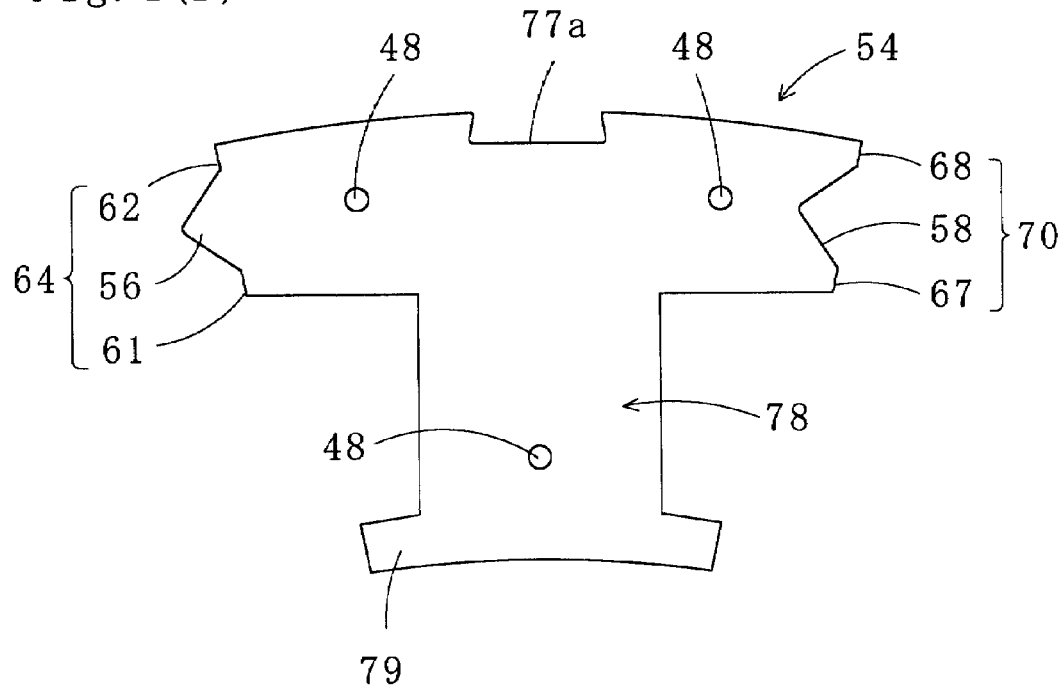

FIG. 3 shows a laminated core segment 52 used to form a laminated core in accordance with a second embodiment of the present invention. The laminated core segment 52 has substantially the same structure as that of the laminated core segment 10 used to form the laminated core in accordance with the first embodiment. However, the brimmed convexities 23, 26 and the brimmed concavities 24, 25 of the core segment sheets 21, 22 which form the first and the second joining sections 19, 20 have different shapes. FIG. 4 shows two types of core segment sheets 53, 54 to be located in the middle lamination position of the laminated core segment 52.

In the core segment sheets 53, 54, isosceles triangles forming convexities 55, 56 have round apexes, and isosceles triangles forming concavities 57, 58 have also round apexes and the same apex angles as the isosceles triangles forming the convexities 55, 56. It is preferable that the curvature radius of the curves is, e.g., 1/50 to 1/10 of the length of the bases of the isosceles triangles. Brims 59, 60 are respectively located at both sides in the radial direction of the convexity 55, thereby forming a brimmed convexity 63, whereas brims 61, 62 are respectively located at both sides in the radial direction of the convexity 56, thereby forming a brimmed convexity 64. Additionally, brims 65, 66 are respectively located at both sides in the radial direction of the concavity 57, thereby forming a brimmed concavity 69, whereas brims 67, 68 are respectively located at both sides in the radial direction of the concavity 58, thereby forming a brimmed concavity 70.

The laminated core segment 52 is formed by alternately laminating sets of the core segment sheets 53 and sets of the core segment sheets 54, each set consisting of three to twelve, while the adjacent core segment sheets are interlocked. Thus, in the laminated core segment 52, sets of the plural numbers of brimmed convexities 63, 64 and brimmed concavities 69, 70 are laminated to form a first joining section 73 and a second joining section 76. The first joining section 73 is formed of alternate brimmed laminated concavities 71 and brimmed laminated convexities 72. The second joining section 76 is formed of alternate brimmed laminated convexities 74 and brimmed laminated concavities 75.

Additionally, an engagement groove 77 formed at the back of the laminated core segment 52 used in this embodiment have corners chamfered to be arc-shaped in cross section. Both sides of the groove bottom are also formed to be arc-shaped in cross section.

By the first and the second joining sections 73, 76 structured as explained above, shape accuracy of the tips of the brimmed laminated convexities 72, 74 is secured and workers are protected from injuries caused by, e.g., careless contact with the tips. Furthermore, the depressed bottoms of the brimmed laminated concavities 71, 75 are not necessarily round. However, the brimmed laminated concavities 71, 75 having the same shape as the brimmed laminated convexities 72, 74 enhance magnetic coupling between the adjacent laminated core segments 52, which ensures production of efficient motors etc.

Because FIG. 4 shows the core segment sheets 53, 54 used to form the middle position of the lamination, the circumferential width of a magnetic pole shaft piece 78 and the radial width of a magnetic pole tooth piece 79 are largest. However, both widths gradually reduce downward in the lower laminated portion and upward in the upper laminated portion as in the case of the laminated core segment 10 of the first embodiment. The other components of the laminated core segment 52 have the same structures as those of the laminated core segment 10 of the first embodiment. Thus, the components thereof are given the same numbers as those of the laminated core 10 and a detail description thereof is omitted. (A similar omission is made in the embodiments described below.) The reference numeral 77a designates a cutout forming the engagement groove 77.

Figure 5A:
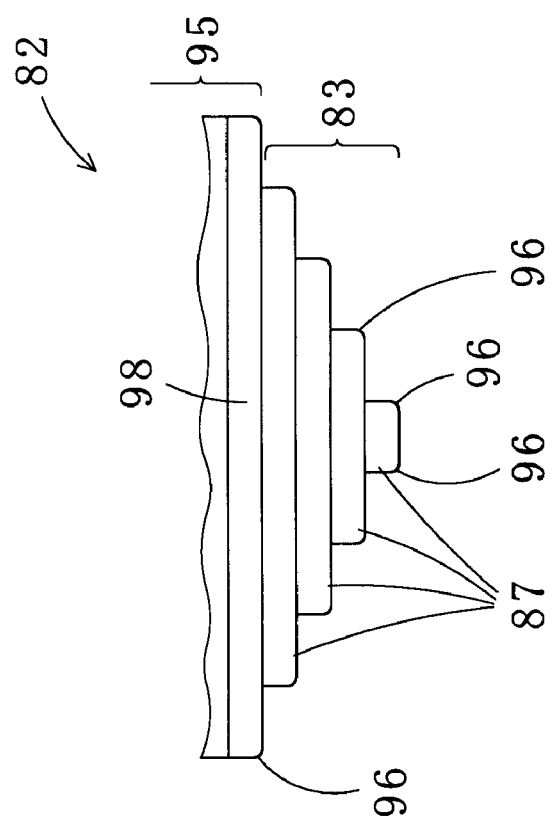
FIGS. 5(A), 5(B) are respectively detailed explanatory views of an upper lower laminated portion and a lower laminated portion of a laminated core segment to be used for a laminated core in accordance with a third embodiment of the present invention.
Figure 5B:
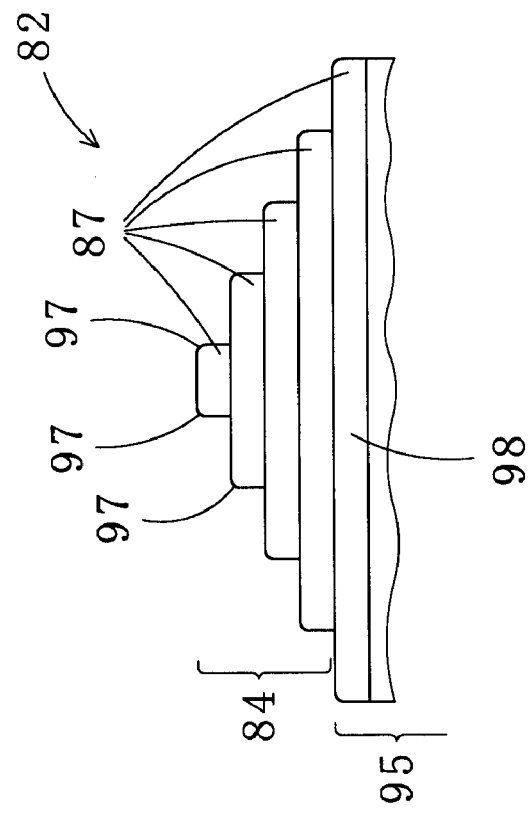

FIGS. 5(A), 5(B) show partial cross sections of the magnetic pole shaft section 12 of a laminated core segment 82 used to form a laminated core in accordance with a third embodiment of the present invention. The laminated core segment 82 is a modification of the laminated core segment 10. As shown in FIG. 2 and FIG. 5, punching burrs directed to the center in the laminating direction are formed in the core segment sheets 21, 22 in the entirety of the laminated core segment 82 except a middle laminated portion 95, i.e., the core segment sheets 21, 22 at a lower laminated portion 83 and an upper laminated portion 84, and the core segment sheets 21, 22 at both ends of the middle laminated portion 95 and in contact with the portions 83, 84. These punching burrs are at both sides 88, 89 of a magnetic pole shaft piece 87, radially outward sides 91, 92 of a magnetic pole tooth piece 90, and radially inward sides 93, 94 of the yoke-segment pieces 27, 36 shown in FIG. 1.

Accordingly, there are no blanking burrs projecting from corners 96, 97 to be in contact with the wires, that are at both sides 88, 89 of the magnetic pole shaft piece 87, the radially outward sides 91, 92 of the magnetic pole tooth piece 90, and the radially inward sides 93, 94 of the yoke-segment pieces 27, 36. Thus, the wires are free from damage. In this embodiment, the punching burrs are directed to the center in the laminating direction only at both sides 88, 89 of the magnetic pole shaft piece 87, the radially outward sides 91, 92 of the magnetic pole tooth piece 90 and the radially inward sides 93, 94 of the yoke-segment pieces 27, 36. Alternatively, the punching burrs may be directed to the center of lamination at the other parts as well, namely, on the entire circumferences (outlines) of the core segment sheets 21, 22 at the upper and lower laminated portions 84, 83, and of the core segment sheet 98 (that is, either one of the core segment sheets 21, 22) in the middle laminated portion 95 in contact with the portions 84, 83.

Figure 6A:
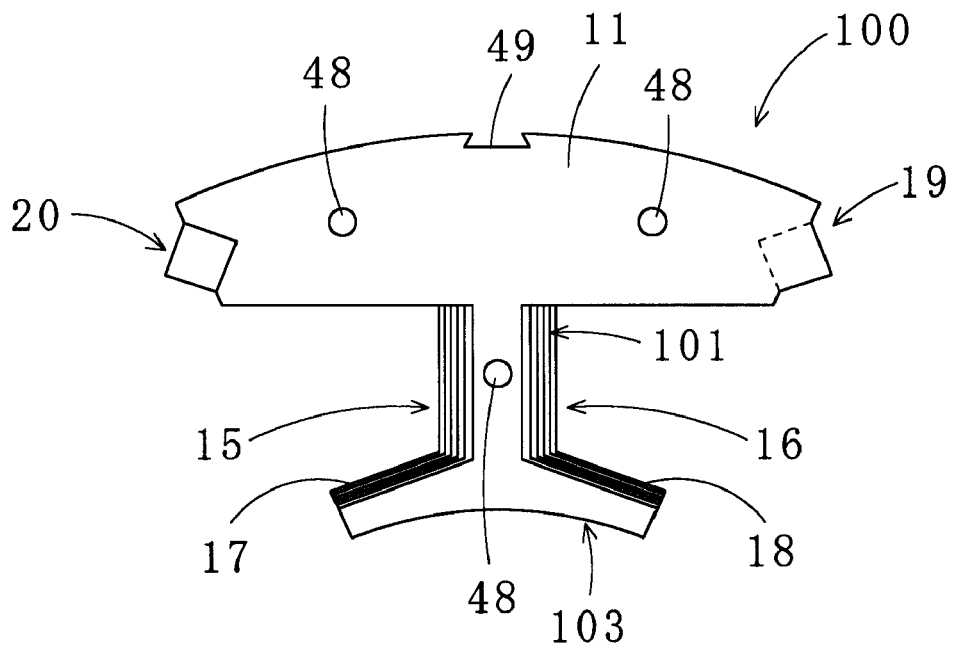
FIGS. 6(A), 6(B) are respectively a plan view and a cross sectional view of a laminated core segment to be used for a laminated core in accordance with a fourth embodiment of the present invention.
Figure 6B:
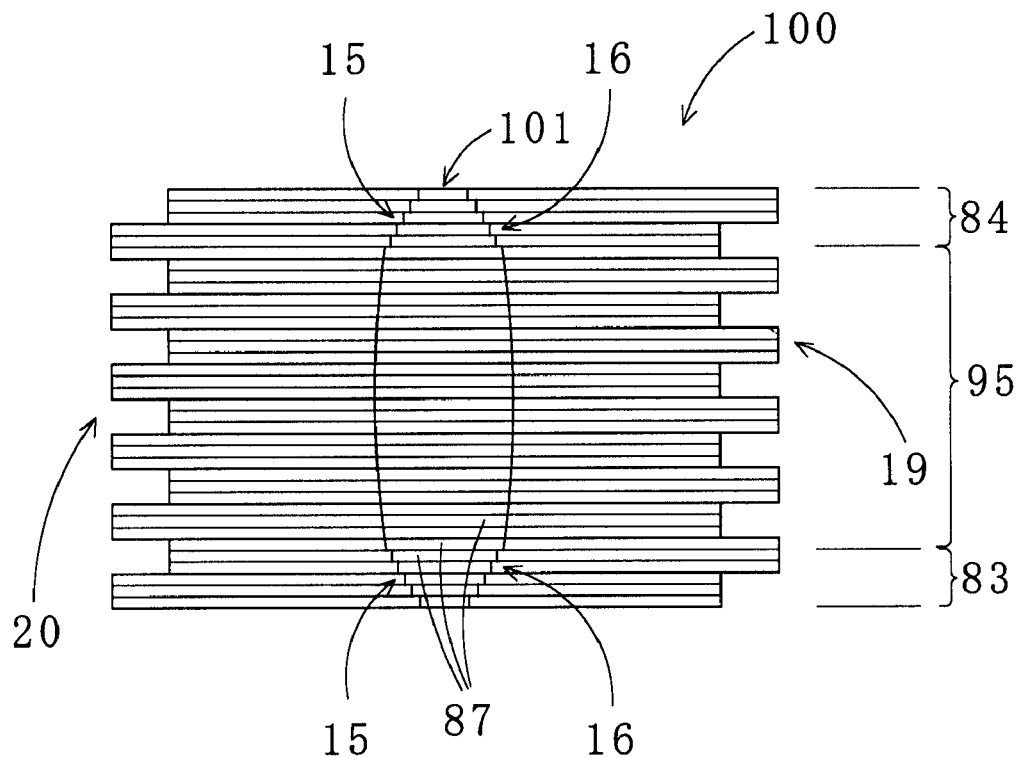

Next, referring to FIGS. 6(A), 6(B), a laminated core segment 100 used to form a laminated core in accordance with a fourth embodiment of the present invention is described. The laminated core segment 100 is a modification of the laminated core segment 10, and has a magnetic pole shaft section 101 expanded in cross section at the middle thereof. In other words, among the magnetic pole shaft pieces 87 in the entirety of the magnetic pole shaft section 101 except the upper and the lower laminated portions 84, 83, i.e., among the magnetic pole shaft pieces 87 at the middle laminated portion 95 of the magnetic pole shaft section 101, the magnetic pole shaft piece 87 at the center in the lamination thickness direction has the largest width, which gradually decreases in the downward and upward directions of lamination. Additionally, the corners 15, 16 at the upper and the lower laminated portions 84, 83 are round in shape as in the case of the laminated core segment 10.

The widths of the magnetic pole shaft pieces 87 at the middle laminated portion 95 increase or decrease by 0.5 to 8% based on the average width of the magnetic pole shaft pieces 87 at the middle laminated portion 95. Increasing the width of the middle laminated portion 95 of the magnetic pole shaft section 101 as described above improves the space factor of the iron core.

A magnetic pole tooth section 103 has an arc-shaped inward side and radially outward sides and may have a radial width maximized in the center of the middle laminated portion and gradually reduced in the upward and downward directions.

Figure 7A:
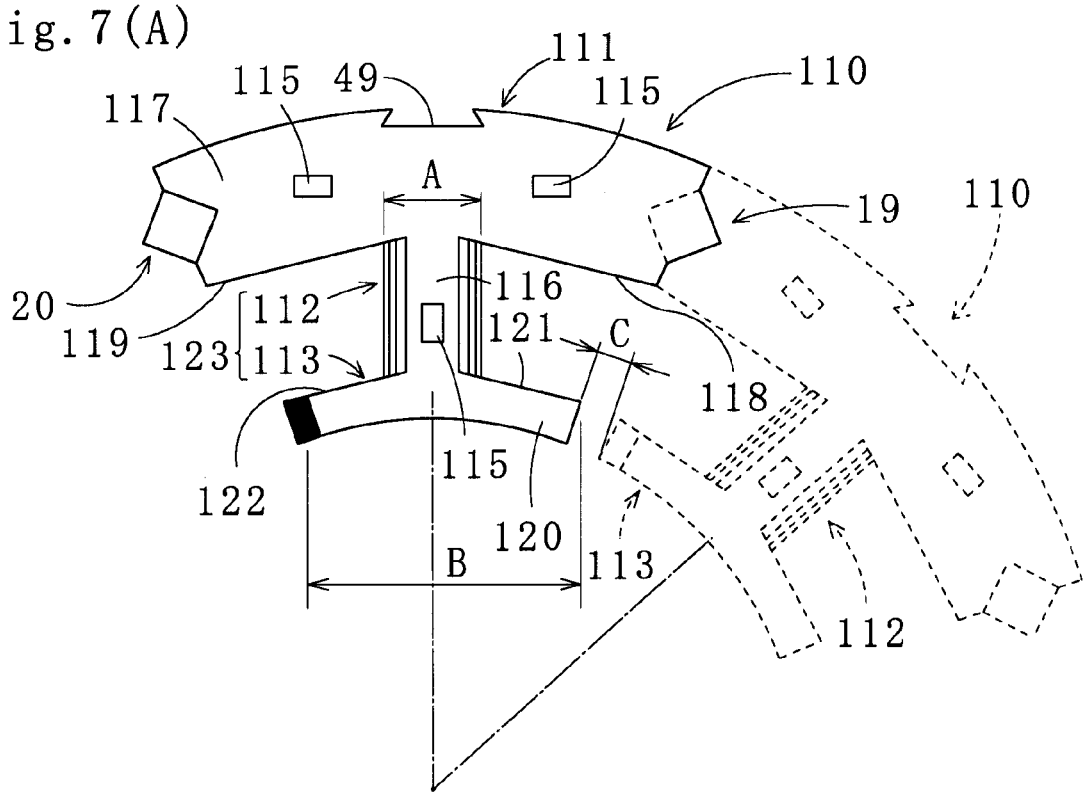
FIGS. 7(A), 7(B) are respectively a plan view and a cross sectional view of a laminated core segment to be used for a laminated core in accordance with a fifth embodiment of the present invention.

Next, referring to FIGS. 7(A), (B), a laminated core segment 110 used to form a laminated core in accordance with a fifth embodiment of the present invention is described. The laminated core segment 110 has a yoke-segment section 111, a magnetic pole shaft section 112 radially inwardly extending from the center of the yoke-segment section 111, and a magnetic pole tooth section 113 having an arc-shaped inward side and connected to the magnetic pole shaft section 112. The first and the second joining sections 19, 20 formed at both ends of the yoke-segment section 111 of the laminated core segment 110 are the same as those of the laminated core segment 10 used for the laminated core in accordance with the first embodiment. Thus, the joining sections of the laminated core segment 110 are given the same numbers as those of the laminated core segment 10 and a detail description thereof is omitted. Additionally, caulking portions 115 for joining core segment sheets 114 vertically employ the known V-caulking (half-press caulking may be used).

In the laminated core segment 110, each core segment sheet 114 has a yoke-segment piece 117 located at both sides of a magnetic pole shaft piece 116 thereof, and the yoke-segment piece 117 has straight radially inward sides 118, 119, and the angles between the centerline of the magnetic pole shaft piece 116 and the radially inward sides 118, 119 are acute angles (70 to 80 degrees, for example). The core segment sheet 114 has a magnetic pole tooth piece 120 that circumferentially diverges from the end of the magnetic pole shaft piece 116. The magnetic pole tooth piece 120 has a radial width constant in the laminating direction. Alternatively, the radial width of the magnetic pole tooth piece 120 may be reduced gradually in the downward direction at the lower laminated portion and in the upward direction at the upper laminated portion to thereby round the lower and upper corners of radially outward sides of the magnetic pole tooth section 113.

The radially outward sides 121, 122 of the magnetic pole tooth piece 120 located at left and right of the magnetic pole shaft piece 116 of the core segment sheet 114 are parallel to the radially inward sides 118, 119 of the yoke-segment piece 117, respectively. In addition, radially outward corners of the magnetic pole tooth section 113 located at both sides of the magnetic pole shaft section 112 have right angles in the upper and lower ends of lamination.

Figure 7B:
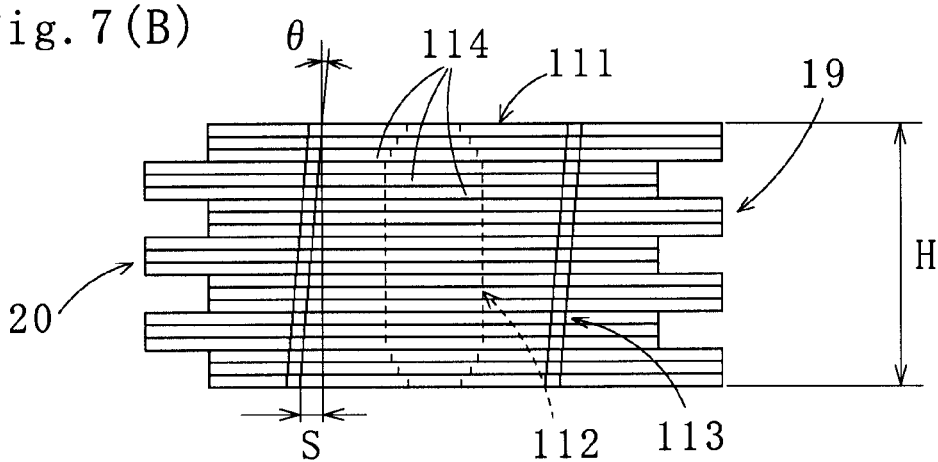

As shown in FIG. 7(B), in the laminated core segment 110 forming the laminated core, the magnetic pole tooth section 113 is not perpendicularly but obliquely disposed to thereby produce a skew at a magnetic pole 123 that is composed of the magnetic pole shaft section 112 and the magnetic pole tooth section 113. If a displacement width in the circumferential direction of the magnetic pole tooth section 113 of the laminated core segment 110 is S, the lamination height of the magnetic pole tooth section 113, i.e., the lamination height of the laminated core segment 110 is H, and the skew angle is θ, the equation $\tan\theta = S/H$ is true.

A gap (minimum gap) C between the magnetic pole tooth sections 113 of the adjacent laminated core segments 110 causes cogging of a rotor, which may further cause nonsmooth rotation of the rotor depending on a load. To prevent such problems, the skew at the magnetic pole tooth section 113 is produced. Thus, preferably $C < S (= H\tan\theta) \leq 1.5C$. The displacement width S exceeding 1.5C (1.2C in actuality) does not actually improve an effect of preventing cogging.

If the skew angle θ is large, one side of the magnetic pole tooth section 113 with respect to the magnetic pole shaft section 112 would disappear. Therefore, it is preferable that the skew angle θ at the magnetic pole tooth section 113 satisfies the expression $\tan\theta \leq (B-A)/4H$, if the maximum width in the circumferential direction of the magnetic pole shaft section 112 is A, the maximum width of the magnetic pole tooth section 113 is B and the total lamination height of the laminated core segment 110 is H. If $\tan\theta$ is larger than $(B-A)/4H$, the magnetic pole tooth section 113 projecting in one circumferential direction with respect to the magnetic pole shaft section 112 is too short to allow wire winding therearound.

Figure 7C:
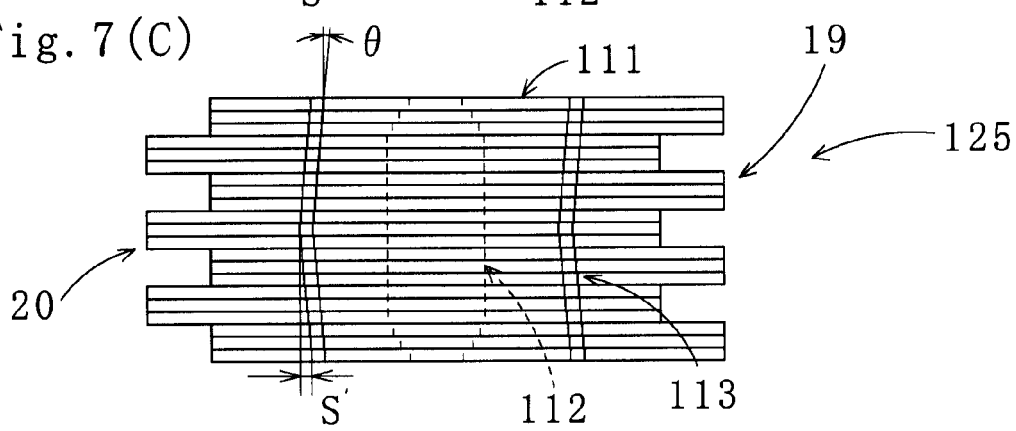
FIG. 7(C) is a cross sectional view of a laminated core segment to be used for a laminated core in accordance with a sixth embodiment of the present invention.

FIG. 7(C) shows a laminated core segment 125 used to form a laminated core in accordance with a sixth embodiment of the present invention. As shown in the figure, the skew angle at the magnetic pole tooth section 113 is symmetrically formed about the center in the lamination thickness direction thereof. As a result, the magnetic pole tooth section 113 appears to be bent when viewed from the radially inward side thereof. In this case, it is desirable that a circumferential displacement width S' at the magnetic pole tooth section 113 produced by the skew is 1 to 1.2 times the size of the gap C between the adjacent magnetic pole tooth sections 113, and the displacement width S' is larger than (B−A)/2, that is, the average length of one side of the magnetic pole tooth section 113 projecting from the magnetic pole shaft section 112.

The skew produced at the magnetic pole tooth section 113 has an effect of reducing cogging of the rotor even if, for example, the displacement width S or S' is smaller than the gap C (for example, 0.2C<S (or S')<C). Thus, the displacement width is not limited to the above-mentioned range in the present invention.

Furthermore, laminated core segments formed by combinations of the components of the above-mentioned laminated core segments 10, 52, 82, 100, 110, 125 also fall within the scope of the present invention.

Next, referring to FIG. 8, a method for manufacturing the laminated core segment 10 used to form the laminated core in accordance with the first embodiment of the present invention (hereinafter referred to as a "first method for manufacturing the laminated core segment") is described. Production of the laminated core segment 10 includes processing steps 1 to 10. Thus, ten stations respectively operable to perform the processing steps 1 to 10 may be provided in one die device. Alternatively, the steps 1 to 10 may be performed in a plurality of die devices. In either case, the die device is of a known structure having a punch or punches at an upper side and a die or dies at a lower side. Thus, a detailed description thereof is omitted.

A strip material 130 made of a magnetic steel sheet having a thickness of, e.g., 0.2 to 0.5 mm is prepared. The strip has an enough width to cover the lateral width of the core segment sheet 21 or 22 to be punched out therefrom.

In the step 1 (station 1, the same hereunder), pilot holes 131, 132 are formed at both ends of the strip material 130, by which the strip material 130 is positioned accurately on the die device or devices. In the step 2, a first slot 133 for one side of the core segment sheet 21 or 22 is produced. In the step 3, a second slot 134 for the other side of the core segment sheet 21 or 22 is produced. The slots 133, 134 form the radially inward sides 93, 94 of the yoke-segment piece 27 or 36, both sides 88, 89 of the magnetic pole shaft piece 87, and the radially outward sides 91, 92 of the magnetic pole tooth piece 90 of the core segment sheet 21 or 22.

The pairs of punches and dies (not shown) each pair making up one die device used in each of the steps 2, 3 are capable of inching in width directions "d" and "e" of the strip material 130. Here, "n" (normally "n" is twenty or more) core segment sheets 21, 22 are to be laminated to form the laminated core segment 10. To stamp the slots 133, 134 for "m" (normally three to six) core segment sheets 21, 22 at the lower laminated portion and the slots 133, 134 for "m" core segment sheets 21, 22 at the upper laminated portion, the width of the magnetic pole shaft piece 87 (see FIG. 1), which is set to a minimum at the uppermost and the lowermost core segment sheets 21, 22, is gradually increased in the downward and upward directions to a normal width "w" of the magnetic pole shaft piece 87. In other words, the punches and dies are stepwise moved away from the reference line determining the centerline of the magnetic pole shaft piece 87 to form core segment sheets 21, 22 of the lower laminated portion, and closer to the reference line to form core segment sheets 21, 22 of the upper laminated portion.

Figure 9A:
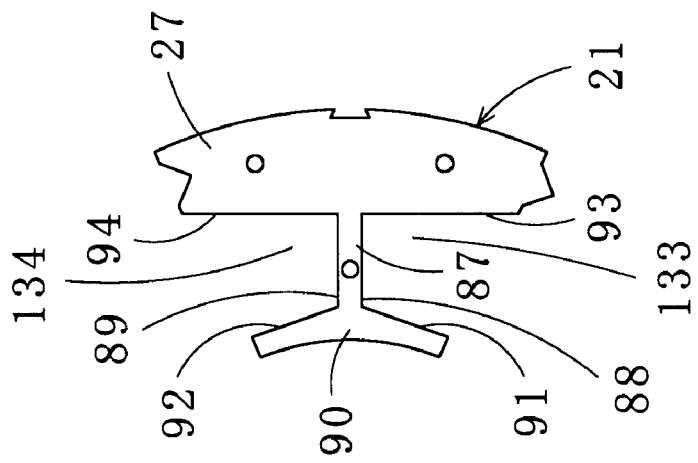
FIGS. 9(A), 9(B), and 9(C) are plan views of the core segment sheets.
Figure 9B:
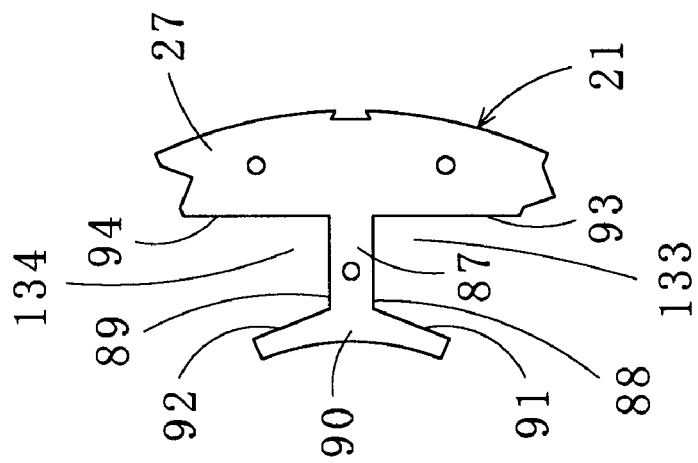
Figure 9C:
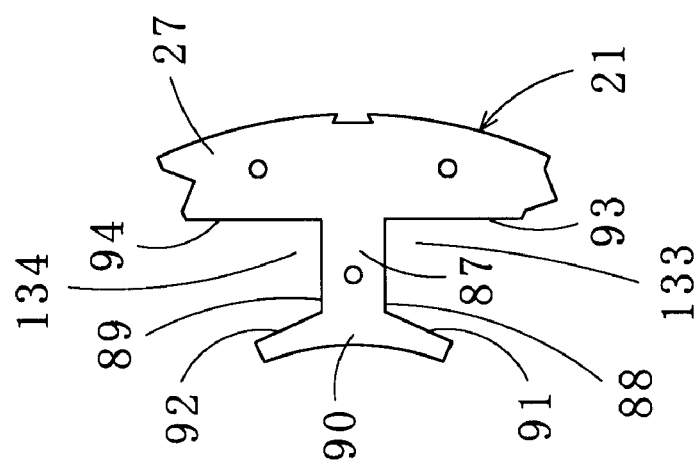

Thus, the following operation is carried out to form the slots 133, 134 for "n" core segment sheets 21, 22 in the steps 2, 3. To form the slots 133, 134 for the first core segment sheet 21 or 22 (core segment sheet 21 in FIG. 1(B)) among the former "m" core segment sheets 21 or 22, the punches and dies are positioned closest to the centerline of the strip material 130. To form the slots 133, 134 for the second core segment sheet 21 or 22, the punches and dies are moved away from the centerline by a slight distance (e.g., about 0.5 to 3 times the strip thickness), and this operation is repeated until the slots 133, 134 for the m-th core segment sheet 21 or 22 are formed. To form the slots 133, 134 for the latter "m" core segment sheets 21 or 22, the punches and dies are gradually moved closer to the centerline. FIGS. 9(A)-9(C) show three out of the finished core segment sheets 21, wherein the widths of the magnetic pole shaft piece 87 and the magnetic pole tooth piece 90 decrease in (A) to (C) order.

When the core segment sheets 21, 22 are laminated, the laminated core segment 10 shown in FIG. 1(B) is formed, which has round corners 15, 16 on the left and right of the upper and lower ends of the magnetic pole shaft section 12. Forming the slots 133, 134 in the above manner produces the laminated core segment 10 wherein the magnetic pole tooth section 13 has the rounded (chamfered) corners 17, 18 at the radially outward sides at the upper end and the lower end thereof, the radially outward sides of the magnetic pole tooth section 13 forming obtuse angles with the magnetic pole shaft section 12. Accordingly, the radial width of the magnetic pole tooth section 13 is reduced toward both ends in the circumferential direction, and gradually reduced upward at the upper laminated portion and downward at the lower laminated portion. As a result, the distances between the radially outward sides of the magnetic pole tooth section 13 and the radially inward sides of the yoke-segment section 11 are gradually increased at the upper and lower ends of the laminated core segment 10. The slots 133, 134 are formed separately in the step 2 and the step 3 in this embodiment, but may be formed in one step (only in the step 2, for example).

Figure 10A:
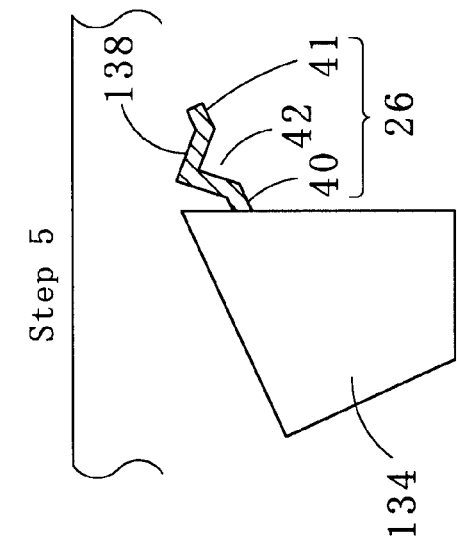
FIGS. 10(A), 10(B) are explanatory views of manufacturing steps of the core segment sheets.

In the step 4, to create the joining sections of the core segment sheet 21, a cutout 136 (fourth slot) is punched out at one side (lower side in FIG. 8), and a cutout 137 (third slot) at the other side. The step 4 is shown in FIG. 10(A) and FIG. 2(A) in detail. The cutout 137 forms the brimmed concavity 24 formed by the concavity 31 and the brims 32, 33, and the cutout 136 forms the brimmed convexity 23 formed by the convexity 28 and the brims 29, 30. The step 4 is omitted in the fabrication process of the core segment sheet 22. The step 5 is to create the joining sections of the core segment sheet 22.

Figure 10B:
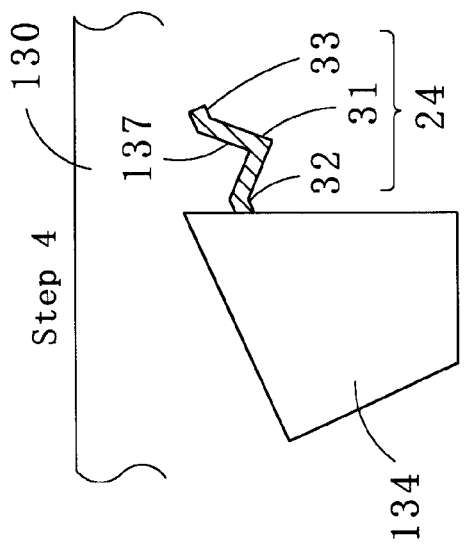
Figure 10B:
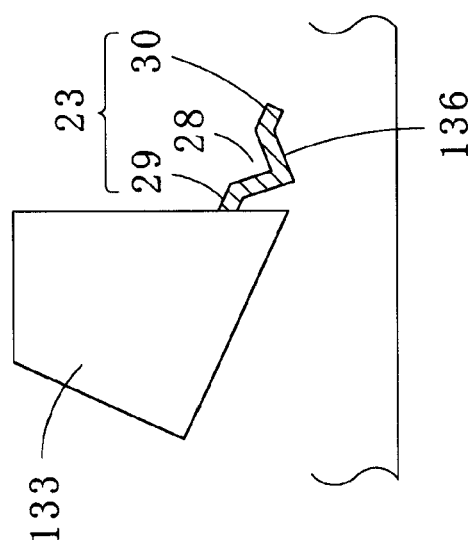

In the step 5, to create the joining sections, a cutout 139 forming the third slot is punched out at one side and a cutout 138 forming the fourth slot is punched out at the other side. The step 5 is shown in FIGS. 10(B) and 2(B) in detail. The cutout 138 forms the brimmed convexity 26 composed of the convexity 42 and the brims 40, 41, and the cutout 139 forms the brimmed concavity 25 composed of the concavity 37 and the brims 38, 39. The step 5 is omitted in the fabrication process of the core segment sheet 21.

The step 6 is to form cutouts 140, 141 to be the circumferential ends of the magnetic pole tooth piece 90 of the core segment sheets 21, 22. The die devices to be used for this punching operation are of a fixed type in this embodiment. The step 7 is to stamp a cutout 142 to be the cutout 49a of the core segment sheets 21, 22. Here, the cutout 49a forms the engagement groove 49 of the laminated core segment 10. The step 8 is to punch out the caulking holes 48 (one example of the caulking portion) of the lowermost core segment sheet 21 or 22 (core segment sheet 21 in this embodiment). The step 9 is to punch out the caulking portions 48 (half-blanking concavity and half-blanking projection) of the core segment sheets 21, 22 other than the lowermost sheet.

In the step 10, the outline of the core segment sheet 21 or 22 is punched out, and the sheets are laminated and interlocked in the lower cutting device, i.e., in the die, to thereby form the laminated core segment 10. Through the steps, a predetermined number of the laminated core segments 10 are manufactured and each of the laminated core segments 10 is fixed to a jig at the engagement groove 49 thereof. After the wires are wound around the magnetic pole shaft section 12, the laminated core segments 10 are joined at the first and the second joining sections 19, 20 to form an annular laminated core.

In the following, there are explained methods of manufacturing the laminated core segments 52, 82, 100, 110, 125 used in the laminated cores in accordance with the second through sixth embodiments. The basic features of these methods are the same as those of the manufacturing method of the laminated core segment 10. Thus, for explanation of the methods of manufacturing the laminated core segments 52, 82, 100, 110, 125, only different features are described and descriptions of overlapping features are omitted.

Next, there is described the method for manufacturing the laminated core segment 52 shown in FIGS. 3, 4 used in the laminated core in accordance with the second embodiment of the present invention. The fabrication processes of the core segment sheets 53, 54 used to form the laminated core segment 52 are basically the same as those in the first method for manufacturing the laminated core segment. However, the cutout 77a to form the engagement groove 77, brimmed concavities 69, 70, and brimmed convexities 63, 64 have different shapes from those of the core segment sheets 21, 22 forming the laminated core segment 10. In other words, in the laminated core segment 10, the cutout 49a, brimmed convexities 23, 26 and brimmed concavities 24, 25 have corners formed by the intersections of planes, and the corners are sharp. On the other hand, in the laminated core segment 52, the corners are round at the cutout 77a, brimmed concavities 69, 70 and brimmed convexities 63, 64.

Figure 8:
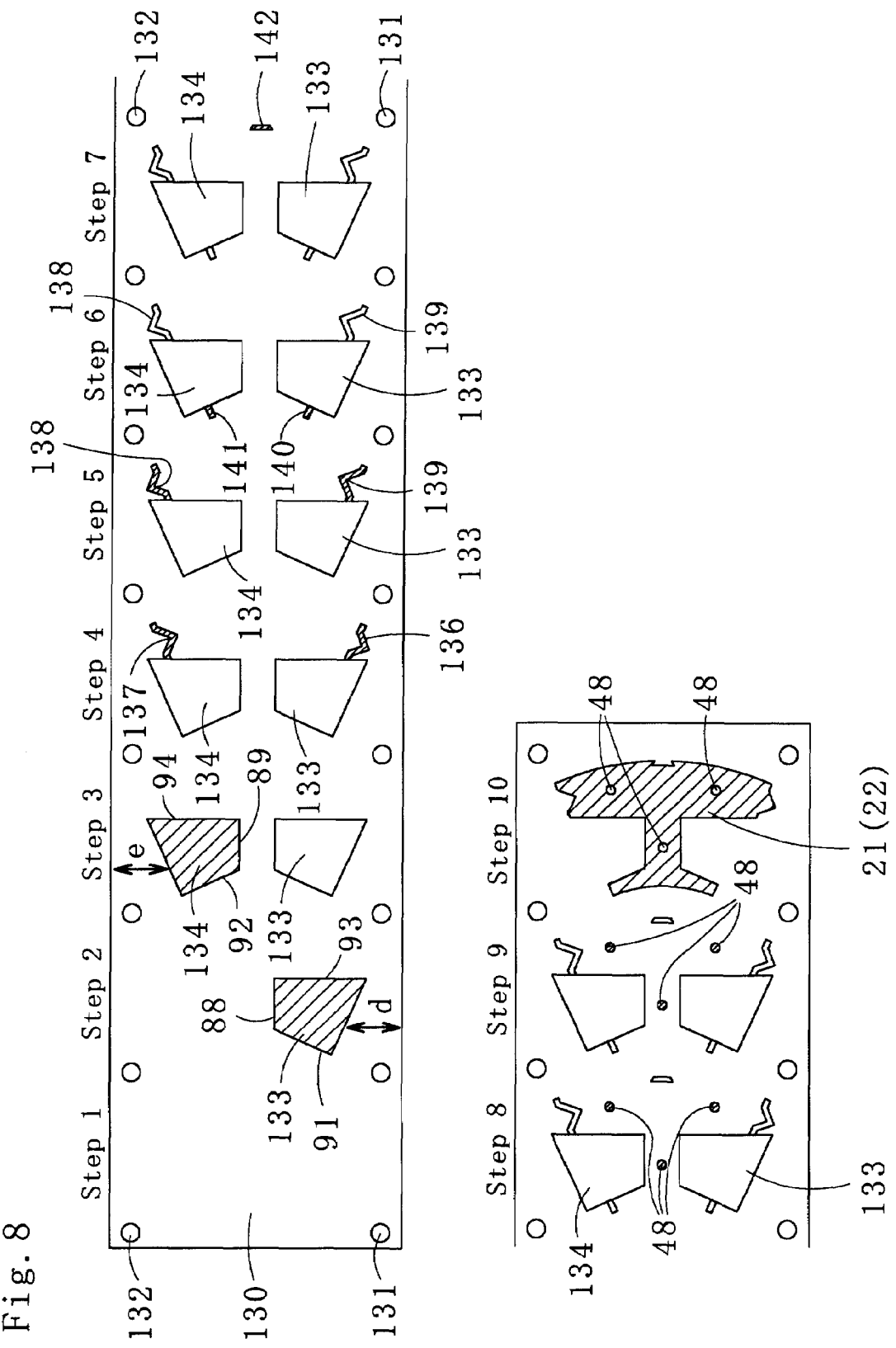
FIG. 8 is an explanatory view illustrating manufacturing steps of the laminated core segment.

Rounding the corners of the brimmed concavities 69, 70 and the brimmed convexities 63, 64 as described above makes it easy to manufacture the die devices used in the steps 4, 5 and 7 shown in FIG. 8. To make a corner formed by intersected planes, it is usually necessary to use two die devices for making a sheet in combination or to use a die device manufactured by extremely precise machining. On the other hand, the round corner having an arc-shaped plane can be formed easily by use of one die device. Furthermore, when the corner is sharp, the die devices wear excessively, while, when the corner is round, wear of the die devices is reduced, and consequently, the cost for die devices can be saved. Meanwhile, all the corners in the laminated core segment 52 may be rounded, which elongates the life of the die devices.

Figure 11:
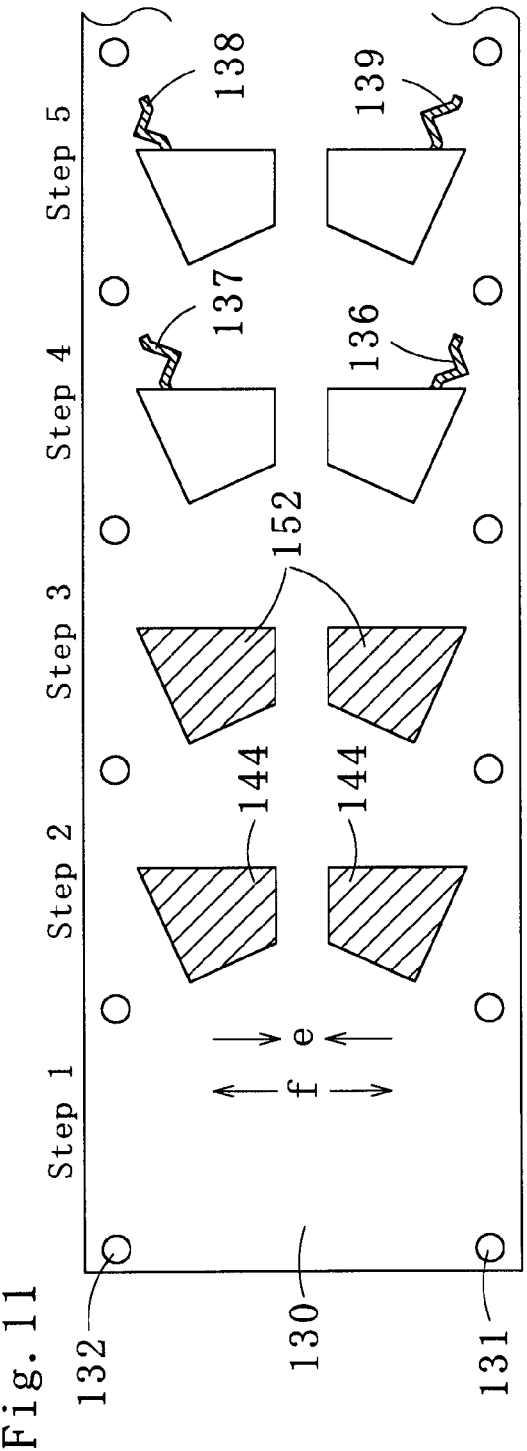
FIG. 11 is an explanatory view illustrating manufacturing steps of the laminated core segment.
Figure 11:
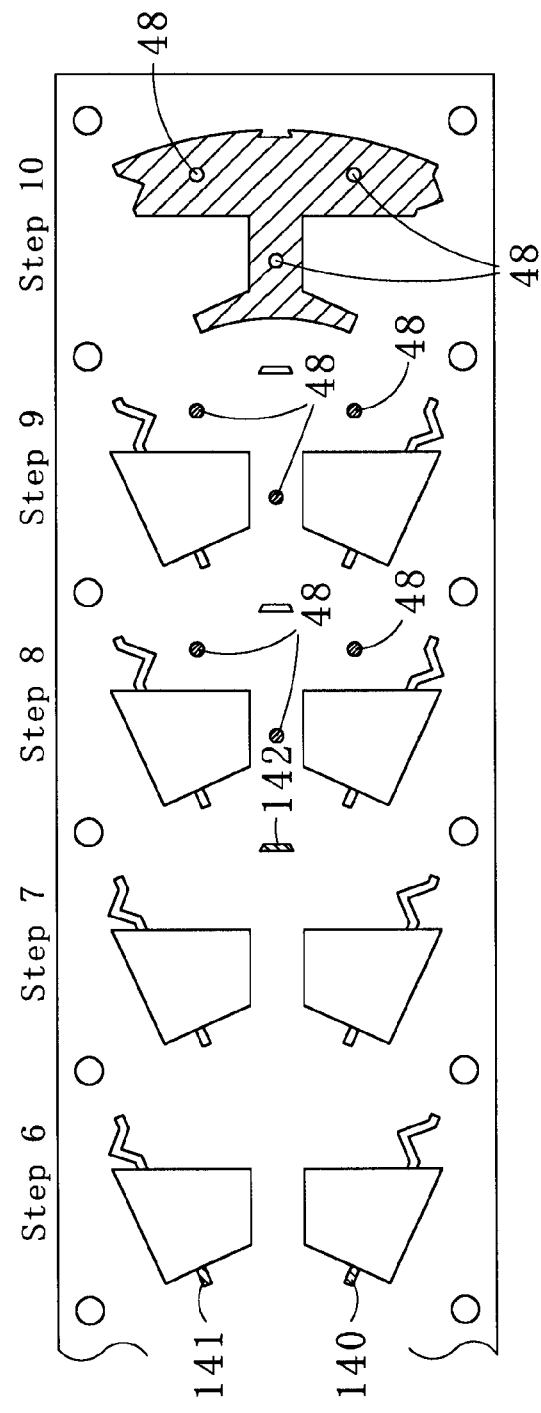
Figure 12A:
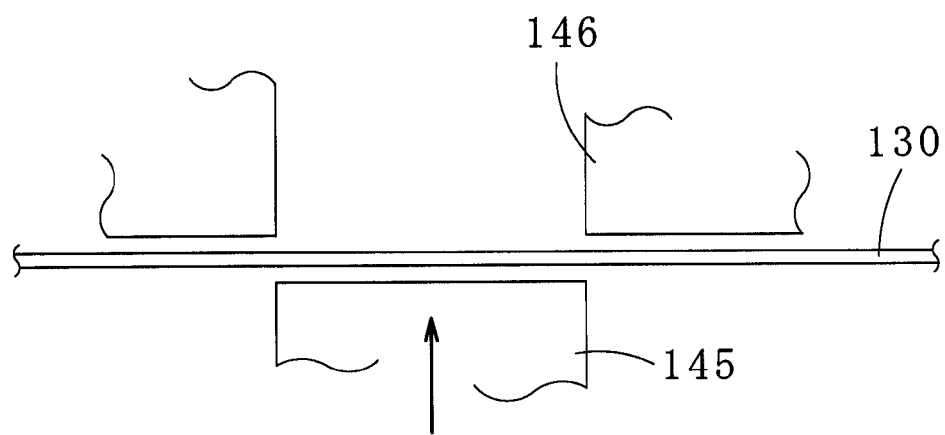
FIGS. 12(A), 12(B) are explanatory views illustrating how the core segment sheet is produced.

Next, FIG. 11 shows a method for manufacturing a laminated core segment 82 shown in FIGS. 5(A), 5(B) to be used for the laminated core in accordance with the third embodiment of the present invention. Because the method shown in FIG. 11 is the same as that of FIG. 8 except for the steps 2, 3, the same components are given the same numbers and descriptions thereof are omitted. The step 2 is to punch out slots for forming the magnetic pole shaft piece 87 positioned at the lower laminated portion. In FIG. 11, the reference numerals 144 designate a pair of slots. As shown in FIG. 12(A), a punch 145 and a die 146 to be a counterpart thereof are fixedly disposed under and above the strip material 130 that is a plate to be processed, respectively, and in the step 2, the punch 145 punches the strip material 130 from below. The punch 145 and die 146 form one punching die device.

Figure 12B:
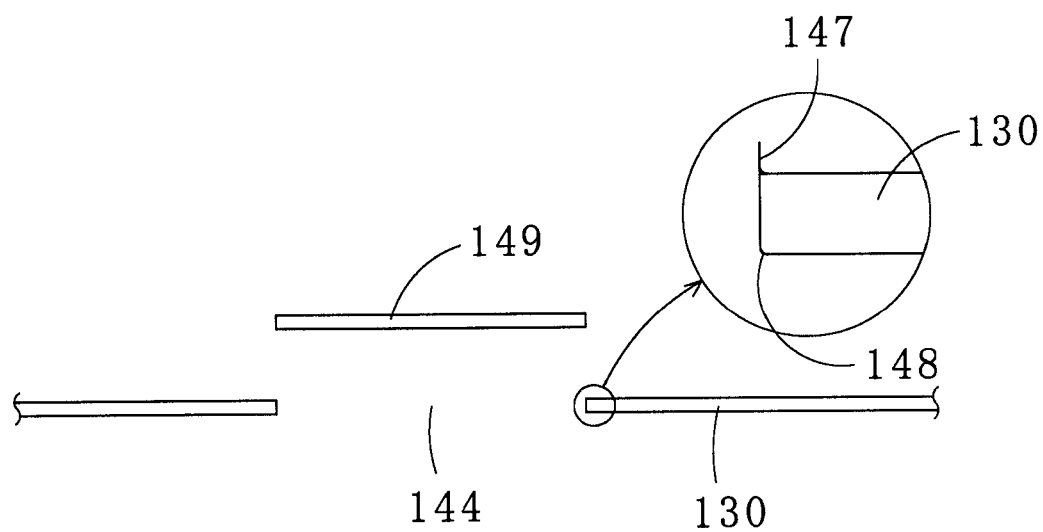

By such configuration, as shown in FIG. 12(B), punching burrs 147 generated by punching are directed upward, and the punched edges on the bottom of the strip material 130 have shear droops 148 and thus have round corners. The reference numeral 149 designates a punched piece. Thus, the step 2 is to punch out the slots 144 for the core segment sheets 21, 22 to be positioned at the lower laminated portion and immediately thereabove. In the step 2, the die devices each including the punch 145 and die 146 are positioned nearest to the centerline of the strip material 130 to punch out the lowermost core segment sheet 21, and the die devices are moved outward from the centerline of the strip material 130 stepwise every time the die devices punch the slots 144 for one core segment sheet 21 to be positioned immediately above the previously punched sheet 21. Thus, the width of the magnetic pole shaft piece 87 of each of the core segment sheets 21, 22 gradually increase. In other words, the die devices each having the punch 145 and die 146 in pair move toward (in a direction "e") and apart from (in a direction "f") the centerline of the strip material 130, thereby determining the positions of the pair of slots 144.

The step 2 is to punch out only "m (normally four to seven)" core segment sheets 21, 22 positioned at the lower laminated portion of the laminated core segment 82 and right above the lower laminated portion. Thus, the step 2 is omitted in the fabrication process of the core segment sheets 21, 22 to be positioned in the other laminated portions. The step 2 ensures the production of the laminated core segment 82 that has the round corners at both sides in the circumferential direction of the magnetic pole shaft piece 87 and that has no downward punching burrs projecting from the core segment sheets 21 and 22 at the lower laminated portion and immediately thereabove, as shown in FIG. 5(B).

Figure 13A:
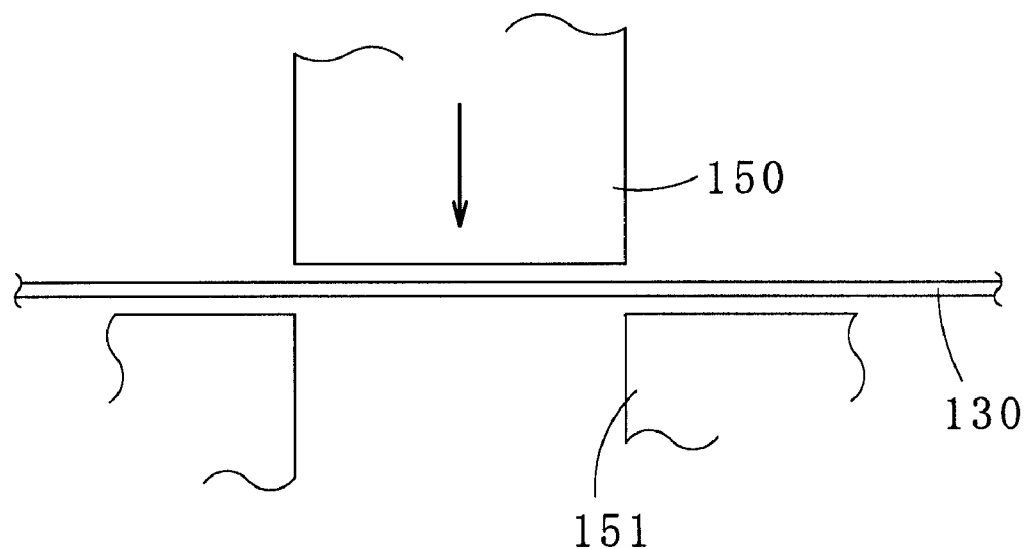
FIGS. 13(A), 13(B) are explanatory views illustrating how the core segment sheet is produced.
Figure 13B:
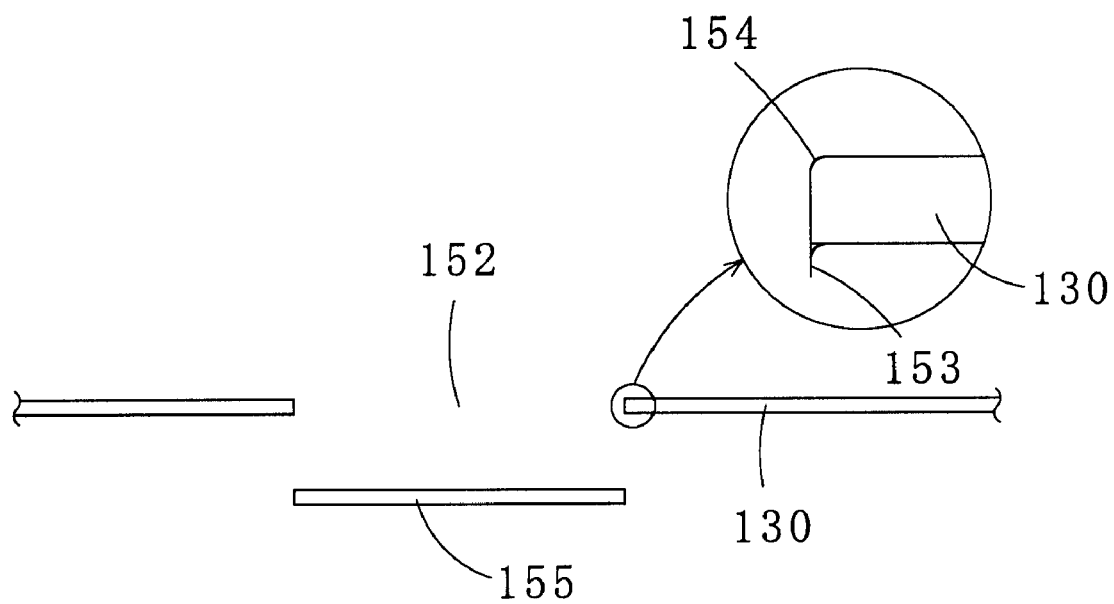
Figure 14:
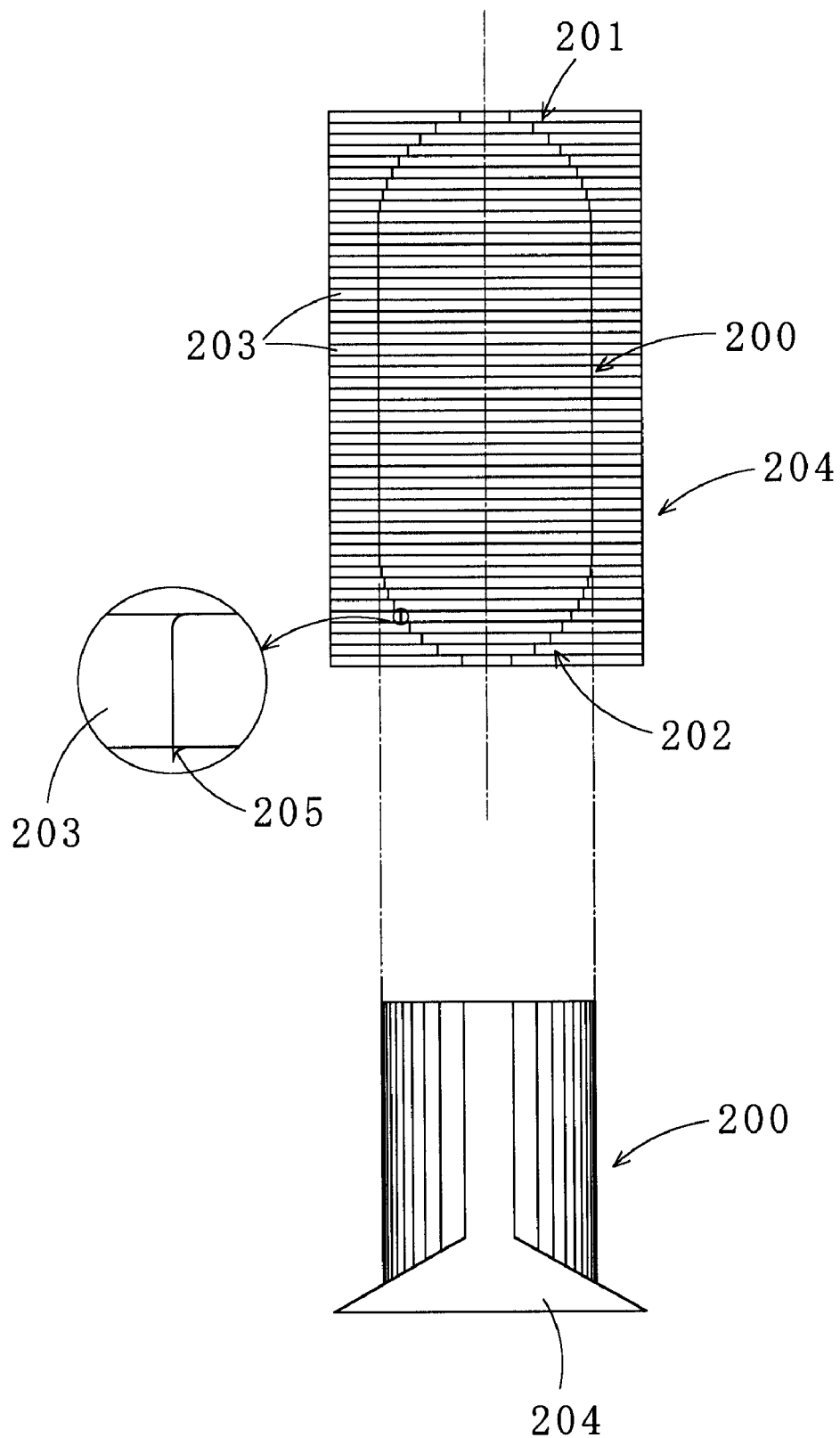
FIG. 14 is an explanatory view of a laminated core segment in accordance with prior art.

In the step 3, a pair of slots 152 for forming the rest of the core segment sheets 21, 22 in the laminated core segment 82 is formed. As shown in FIGS. 13(A), 13(B), a punch 150 and a die 151 forming a die device are disposed above and below the strip material 130, respectively. The punch 150 is moved downward to punch out the slot 152. In this case, downward punching burrs 153 are formed by the punching, and shear droops 154 and round corners are formed at the upper punched edges of the strip material 130. The reference numeral 155 designates a punched piece.

Therefore, the punching burrs are directed downward in the core segment sheets 21, 22 of the laminated core segment 82 except at the lower laminated portion and immediately thereabove. Each pair of the punch 150 and die 151 used in the step 3 is capable of inching toward (in the direction "e") and away from (in the direction "f") the centerline of the strip material 130. It is assumed that "n" (normally "n" is twenty or more) core segment sheets 21, 22 are to be laminated to form the laminated core segment 82. To stamp the slots 152 for "m" (normally four to seven) core segment sheets 21, 22 at the upper laminated portion, the core segment sheet 21 (or 22) right below the upper laminated portion includes the magnetic pole shaft piece 87 having a regular width "w," and the die devices are moved stepwise toward the centerline of the strip material 130 (consequently toward the centerline of the magnetic pole shaft piece 87) to narrow the width of the magnetic pole shaft piece 87.

The following operation is carried out to form the slots 144 for "m" (four to seven, for example) core segment sheets 21, 22 in the step 2. To form the slots 144 for the lowermost core segment sheet among the "m" core segment sheets 21, 22 at the lower laminated portion, the punches 145 and dies 146 are positioned nearest to the centerline of the strip material 130. To form the slots 144 for the second core segment sheet, the punches and dies are moved outward from the centerline by a slight distance (e.g., about 0.5 to 3 times the strip thickness), and this operation is repeated until the slots 144 for the m-th core segment sheet 21 or 22 is formed. In the step 3, the slots 152 for the core segment sheets 21, 22 at the intermediate portion (the number of core segment sheets 21, 22 is n−2m) are punched out, and for fabrication of the latter "m" core segment sheets 21, 22, the punches 150 and dies 151 are gradually moved toward the centerline of the strip material 130 to punch the slots 152. The symbol "n" represents the number of the total core segment sheets 21, 22, which is twenty or more.

Due to the above-described movements of the punches 145 and dies 146 and punches 150 and dies 151, the corners having round cross sections and thus no sharp edges are formed in the lower and upper laminated portions of the magnetic pole tooth section 13 at the radially outward sides thereof as well as in the magnetic pole shaft section 12. Neither the radially outward sides of the magnetic pole tooth section 13 nor the radially inward sides of the yoke-segment section 11 have the punching burrs projecting downward at the lower laminated portion and upward at the upper laminated portion. Thus, the wires are not damaged by the punching burrs. The subsequent steps 4 to 10 are the same as those of the first method for manufacturing the laminated core segment shown in FIG. 8.

Accordingly, there are no blanking burrs projecting from the corners 96, 97 to be in contact with the wires, that are at both sides 88, 89 of the magnetic pole shaft piece 87, the radially outward sides 91, 92 of the magnetic pole tooth piece 90, and the radially inward sides 93, 94 of the yoke-segment pieces 27, 36. Thus, the wires are free from damage. In this embodiment, the punching burrs are directed upward only at the lower portion of the laminated core segment 82. Alternatively, the punching burrs may be directed upward at the lower half and downward at the upper half of the laminated core segment 82.

A method for manufacturing the laminated core segment 100 used in the laminated core in accordance with the fourth embodiment shown in FIG. 6 is described. The laminated core segment 100 is distinct from the laminated core segment 10 in that the magnetic pole shaft section 101 is increased in cross section in the middle laminated portion 95. To produce the laminated core segment 100, the core segment sheets 21, 22 to be positioned at the middle laminated portion 95 are formed by increasing and decreasing the widths of the slots 133, 134 with respect to the centerline (i.e., center in widthwise direction) of the strip material 130 in the steps 2, 3 of the producing method shown in FIG. 8. This process can be done by moving the positions of the slots 144, 152 in the steps 2, 3 of the producing method shown in FIG. 11.

Referring now to FIG. 8, a method for manufacturing the laminated core segment 110 shown in FIGS. 7 (A), 7(B) is described. The laminated core segment 110 is different from the laminated core segment 10 basically in that a skew is formed at the magnetic pole tooth section 113. The skew is formed by moving die devices (each having a punch and a die) in the circumferential direction stepwise every time the cutouts 140, 141 are punched out to form the circumferential ends of the magnetic pole tooth piece 120, thereby moving the positions of the cutouts 140, 141. If the number of the core segment sheets 114 of the laminated core segment 110 is "n" and the displacement width in the circumferential direction of the magnetic pole tooth piece 120 is S, the inching distance is S/n. Since V-shaped caulking is used at the caulking portions 115 of the laminated core segment 110, the known V-caulking is employed in the steps 8, 9 in place of half-blanked caulking.

Likewise, in the manufacture of the laminated core segment 125 shown in FIG. 7(C), the positions of the cutouts 140, 141 are controlled in the step 6 to thereby gradually change the position where the magnetic pole tooth piece 120 is formed. Furthermore, in the manufacture of the laminated core segments 110, 125, the manufacturing method shown in FIG. 11 may be of course adopted.

The laminated core segments and the methods of manufacturing the same have been described individually referring to the first to sixth embodiments. However, the present invention also includes laminated core segments formed by combinations of the elements of the embodiments. The above-mentioned embodiments have been described with specific values, but the present invention is not limited to the values.

INDUSTRIAL APPLICABILITY

In the laminated cores and the methods of manufacturing the same in accordance with the present invention, the laminated core segments to configure the laminated core are connected by the first and the second joining sections, and the concavity comprising the triangular recess and the convexity comprising the triangular projection are formed in the middle of the radial rims at the first and the second joining sections. Thus, by visually checking the engagement at the rims, it can be judged whether the adjoining laminated core segments are jointed properly. As a result, a completely circular laminated core is formed by a predetermined number of the laminated core segments. The first and the second joining sections are formed by alternately laminating the sets of the core segment sheets of one type and the sets of the core segment sheets of the other type, each set consisting of a predetermined number (namely, a plurality) of sheets, each of the core segment sheets of either type having the brimmed concavity and brimmed convexity. Thus, the concavities and convexities of the first and the second joining sections are teeth-shaped when viewed from the radial side thereof, whereby, when the first and the second joining sections between the adjoining laminated core segments are engaged with each other, the vertical movement of the laminated core segments that form the laminated core is completely prevented.

Each of the concavity and convexity to be fitted with each other of each laminated core segment includes brims at both sides in the radial direction thereof, so that the sizes of the triangularly shaped concavity and convexity and thus those of engagement portions are small. Furthermore, because the triangularly shaped concavity and convexity are engaged with each other, the radial movement of adjacent laminated core segments is prevented when the brims of the adjacent laminated core segments are fitted with each other.

Furthermore, in the laminated core segments composing the laminated core, if the corners of the lower and upper laminated portions are rounded not only at the magnetic pole shaft section but also at the magnetic pole tooth section, the wires are substantially free from damage, which eliminates trouble in the finished rotor and the rotor in operation. In particular, at the lower and upper laminated portions of the laminated core around which the wires are wound, directing the punching burr to the middle laminated portion further prevents damage to the wires.

The invention claimed is:

1. A laminated core having a plurality of laminated core segments connected by first joining sections and second joining sections, each of the laminated core segments having a yoke-segment section and a magnetic pole located radially inward from the yoke-segment section, the yoke-segment sections forming an annular shaped yoke, the first joining sections and second joining sections located at both ends in a circumferential direction of the yoke-segment sections of the respective laminated core segments, the magnetic pole composed of a magnetic pole shaft section projecting radially inward from the yoke-segment section and a magnetic pole tooth section located radially inward from the magnetic pole shaft section, each of the laminated core segments formed by laminating and interlocking a predetermined number of core segment sheets, each of the core segment sheets having: a yoke-segment piece corresponding to the yoke-segment section, a magnetic pole shaft piece corresponding to the magnetic pole shaft section and a magnetic pole tooth piece corresponding to the magnetic pole tooth section, the laminated core comprising: a brimmed concavity and a brimmed convexity respectively located at both ends in a circumferential direction of each yoke-segment piece, the brimmed concavity having: a triangularly shaped recess notched in the circumferential direction of the yoke-segment piece, a radially outward brim and a radially inward brim, the brimmed convexity having: a triangularly shaped projection projecting in the circumferential direction of the yoke-segment piece and conforming in shape to the recess, a radially outward brim and a radially inward brim, wherein the first and the second joining sections at both ends of each laminated core segment are formed by alternately laminating sets of the core segment sheets of one type and sets of the core segment sheets of the other type, each set consisting of a predetermined number of sheets, the core segment sheets of the two types being different in the shapes of both ends in a circumferential direction thereof, each sheet having the brimmed concavity and the brimmed convexity at both ends in the circumferential direction thereof.

2. The laminated core as defined in claim 1, wherein each of the recess of the brimmed concavity and the projection of the brimmed convexity forms a triangle having a base with a length in the range of 0.3 to 0.6 times a width of each of both ends in the circumferential direction of the yoke-segment piece.

3. The laminated core as defined in claim 1, wherein each of the recess of the brimmed concavity and the projection of the brimmed convexity forms an isosceles triangle having an apex angle in the range of 75 to 105 degrees.

4. The laminated core as defined in claim 1, wherein each of the recess of the brimmed concavity and the projection of the brimmed convexity forms a triangle having a round apex.

5. The laminated core as defined in claim 1, wherein the yoke-segment piece of each core segment sheet circumferentially diverges from one end of the magnetic pole shaft piece and has radially inward sides in a straight shape;

the magnetic pole tooth piece of each core segment sheet circumferentially diverges from the other end of the magnetic pole shaft piece and has a radially inward side in an arc-shape and radially outward sides in a straight shape; and distances between inner ends of the yoke-segment piece and outer ends of the magnetic pole tooth piece gradually increase in circumferentially outward directions with increase in distance from the magnetic pole shaft piece.

6. The laminated core as defined in claim 5, wherein the radially inward sides of the yoke-segment piece circumferentially diverging from the end of the magnetic pole shaft piece are on a line orthogonal to a centerline of the magnetic pole shaft piece.

7. The laminated core as defined in claim 6, wherein the magnetic pole tooth pieces each circumferentially diverging from the end of the magnetic pole shaft piece have radial widths decreasing in a downward direction at a lower laminated portion of the laminated core segment and decreasing in an upward direction at an upper laminated portion of the laminated core segment so that the magnetic pole tooth section of the laminated core segment has round corners in cross section at the lower and upper laminated portions thereof.

8. The laminated core as defined in claim 7, wherein the magnetic pole shaft section of the laminated core segment has a circumferential width gradually decreasing in the downward direction at the lower laminated portion of the laminated core segment and gradually decreasing in the upward direction at the upper laminated portion thereof so that the magnetic pole shaft section has round corners in cross section at the lower and upper laminated portions thereof.

9. The laminated core as defined in claim 1, wherein the magnetic pole shaft section of the laminated core segment has a circumferential width gradually decreasing in a downward direction at a lower laminated portion of the laminated core segment and gradually decreasing in an upward direction at an upper laminated portion thereof so that the magnetic pole shaft section has round corners in cross section at the lower and upper laminated portions thereof.

10. The laminated core as defined in claim 9, wherein among the magnetic pole shaft pieces positioned at a middle laminated portion of the magnetic pole shaft section serving as the entirety of the magnetic pole shaft section except the upper and lower laminated portions, the magnetic pole shaft piece at the center in a laminating direction of the middle laminated potion has a maximized width, the width gradually reducing in downward and upward laminating directions thereof.

11. The laminated core as defined in claim 1, wherein the magnetic pole shaft pieces of the core segment sheets at an upper laminated portion of the laminated core segment have downward punching burrs formed by punching using a pressing machine, and the magnetic pole shaft pieces of the core segment sheets at a lower laminated portion of the laminated core segment have upward punching burrs formed by punching using a pressing machine.

12. The laminated core as defined in claim 1, wherein the magnetic pole tooth section has a centerline at an angle to a centerline of the magnetic pole shaft section and has a skew.

13. The laminated core as defined in claim 12, wherein an angle $\theta$ of the skew satisfies the expression: $\tan\theta \leqq (B-A)/4H$, wherein A is a maximum width of the magnetic pole shaft section, B is a maximum width of the magnetic pole tooth section and H is a lamination height of the laminated core segment.

14. The laminated core as defined in claim 12, wherein an angle $\theta$ of the skew satisfies the expression: $C/H < \tan\theta \leqq 1.5 (C/H)$, wherein C is a clearance between the adjacent magnetic pole tooth sections and H is a lamination height of the laminated core segment.

15. The laminated core as defined in claim 1, wherein an engagement groove is formed vertically in the middle of and in a radially outward area of the yoke-segment section of the laminated core segment, and the groove has a width gradually increasing in the radially inward direction thereof.

16. A method for manufacturing a laminated core as defined in claim 8, comprising:

a first step of forming positioning pilot holes at predetermined intervals in a strip material, the strip material made of a magnetic sheet;

a second step of punching first slots and second slots in the strip material having the pilot holes, each of the first slots forming: one side of the magnetic pole shaft piece of the core segment sheet, one radially inward side of the yoke-segment piece, and one radially outward side of the magnetic pole tooth piece, the one radially inward side and the one radially outward side being located on the same side of the strip material as the one side of the magnetic pole shaft piece, each of the second slots forming: the other side of the magnetic pole shaft piece of the core segment sheet, the other radially inward side of the yoke-segment piece, and the other radially outward side of the magnetic pole tooth piece, the other radially inward side and the other radially outward side being located on the same side of the strip material as the other side of the magnetic pole shaft piece;

a third step of forming third slots and fourth slots, the third slot and the fourth slot respectively forming the brimmed concavity and the brimmed convexity located at both circumferential ends of the core segment sheet, the third slot and the fourth slot being interchanged in the positions relative to each other by each predetermined number of sheets;

a fourth step of forming caulking portions at predetermined positions of the core segment sheet for connecting the core segment sheets located above and below the core segment sheet; and a fifth step of punching outlines of the core segment sheets, laminating and interlocking the core segment sheets in a lower die, thereby forming the laminated core segment, wherein in the second step, punching die devices for forming the first and the second slots for the core segment sheet to be positioned at the lower laminated portion of the laminated core segment punch the first and the second slots while moving, stepwise by every core segment sheet, away from a reference line forming a centerline of the magnetic pole shaft piece; and punching die devices for forming the first and the second slots for the core segment sheet to be positioned at the upper laminated portion of the laminated core segment punch the first and the second slots while moving, stepwise by every core segment sheet, closer to the reference line.

17. The method for manufacturing a laminated core as defined in claim 16, wherein in the step 2, the second slots are punched after the first slots are punched.

18. The method for manufacturing a laminated core as defined in claim 16, wherein each of the punching die devices for forming the first and the second slots for the core segment sheets to be positioned at the lower laminated portion of the laminated core segment includes a punch and a die to be provided below and above the strip material, respectively; and each of the punching die devices for forming the first and the second slots for the core segment sheets to be positioned at the upper laminated portion of the laminated core segment includes a punch and a die to be provided above and below the strip material, respectively.

* * * * *